(12) United States Patent
Voorhees et al.

(10) Patent No.: US 12,544,329 B2
(45) Date of Patent: Feb. 10, 2026

(54) COMPOSITIONS AND METHODS FOR TREATING AND PREVENTING SKIN DAMAGE

(71) Applicants: The Regents of the University of Michigan, Ann Arbor, MI (US); ACCESS BUSINESS GROUP INTERNATIONAL LLC, Ada, MI (US)

(72) Inventors: John Voorhees, Ann Arbor, MI (US); Yilei Cui, Ann Arbor, MI (US); Tianyuan He, Ann Arbor, MI (US); Gary Fisher, Ann Arbor, MI (US); Louise Schneider, Ada, MI (US); John Rebhun, Ada, MI (US); Arun Rajgopal, Ada, MI (US)

(73) Assignees: The Regents of the University of Michigan, Ann Arbor, MI (US); ACCESS BUSINESS GROUP INTERNATIONAL LLC, Ada, MI (US)

( * ) Notice: Subject to any disclaimer, the term of this patent is extended or adjusted under 35 U.S.C. 154(b) by 701 days.

(21) Appl. No.: 17/788,413

(22) PCT Filed: Dec. 23, 2020

(86) PCT No.: PCT/US2020/066856
§ 371 (c)(1),
(2) Date: Jun. 23, 2022

(87) PCT Pub. No.: WO2021/133914
PCT Pub. Date: Jul. 1, 2021

(65) Prior Publication Data
US 2023/0073285 A1 Mar. 9, 2023

Related U.S. Application Data

(60) Provisional application No. 62/952,931, filed on Dec. 23, 2019.

(51) Int. Cl.
*A61K 8/9789* (2017.01)
*A61Q 19/00* (2006.01)
*A61Q 19/08* (2006.01)

(52) U.S. Cl.
CPC .......... *A61K 8/9789* (2017.08); *A61Q 19/007* (2013.01); *A61Q 19/08* (2013.01)

(58) Field of Classification Search
CPC ................ A61K 8/9789; A61K 8/9794; A61K 2800/591; A61Q 19/007; A61Q 19/08; A61Q 19/02
See application file for complete search history.

(56) References Cited

U.S. PATENT DOCUMENTS

| | | | |
|---|---|---|---|
| 4,857,325 A | 8/1989 | Albeck et al. | |
| 5,804,206 A * | 9/1998 | D'Amelio | A61K 8/9789 424/59 |
| 6,010,701 A | 1/2000 | Matsukura et al. | |
| 2002/0044977 A1 | 4/2002 | Close | |
| 2006/0018867 A1 | 1/2006 | Kawasaki et al. | |
| 2006/0039887 A1 | 2/2006 | Gupta et al. | |
| 2007/0122492 A1* | 5/2007 | Behr | A61K 8/9789 424/754 |
| 2009/0068255 A1 | 3/2009 | Yu et al. | |
| 2010/0239695 A1 | 9/2010 | Vielhaber et al. | |
| 2014/0227363 A1 | 8/2014 | Drapeau et al. | |
| 2015/0104399 A1* | 4/2015 | Ceccoli | A61Q 19/08 424/769 |
| 2015/0224049 A1 | 8/2015 | Florence et al. | |
| 2019/0336884 A1* | 11/2019 | Makerri | A61Q 19/00 |

FOREIGN PATENT DOCUMENTS

| | | |
|---|---|---|
| CN | 106727265 A | 5/2017 |
| CN | 107854394 | 3/2018 |
| CN | 108815081 | 11/2018 |
| CN | 109431930 | 3/2019 |
| JP | S6225190 A | 2/1987 |
| JP | H02200610 A | 8/1990 |
| JP | H10114671 A | 5/1998 |
| JP | 2002205950 A | 7/2002 |
| JP | 2004075632 A | 3/2004 |
| JP | 2004238345 A | 8/2004 |
| JP | 2011068570 A | 4/2011 |
| JP | 2013023487 A | 2/2013 |
| JP | 2014114235 A | 6/2014 |
| JP | 2016065019 A | 4/2016 |
| KR | 10-2019-0074880 A | 6/2019 |
| WO | WO 1998/032454 | 7/1998 |

(Continued)

OTHER PUBLICATIONS

Ribeiro et al. "Main Benefits and Applicability of Plant Extracts in Skin Care Products" Cosmetics 2015, 2, 48-65. (Year: 2015).*
International Search Report and Written Opinion for PCT/US20/66856. Mailed Apr. 5, 2021. 11 pages.
Amazon.com Acure ACURE Ultra Hydrating 12 Hour Moisturized 100% Vegan Intense Moisture for Super Thirsty Skin Adaptogens & Supergreens 1FL Oz. Dec. 15, 2017. 21 pages.
He et al., Oxidative exposure impairs TGF-beta pathway via reduction of type II receptor and SMAD3 in human skin fibroblasts. AGE (2014) 36:1079-1094.

(Continued)

*Primary Examiner* — Sean M Basquill
*Assistant Examiner* — Rajan Pragani
(74) *Attorney, Agent, or Firm* — Casimir Jones, S.C.; Tanya A. Arenson

(57) ABSTRACT

Provided herein are compositions and method for treating and preventing skin damage. In particular, provided herein are compositions that reverse, prevent and/or slow age-related skin damage.

15 Claims, 15 Drawing Sheets
Specification includes a Sequence Listing.

(56) References Cited

FOREIGN PATENT DOCUMENTS

WO    WO 2019/171374    9/2019

OTHER PUBLICATIONS

Walmart.com "Eminence Organic Skin Care Firm Skin Acai moisturizer, 2 Oz" Dec. 11, 2017. 13 pages.
Su:m37 Secret Programming Essence (Advanced Sync Program). CosDNA, Bottle Packaging. Published Sep. 1, 2015. Accessed Jun. 3, 2024. [URL: https://www.cosdna.com/chs/cosmetic_ee98202601.html].
Office Action for CN 202080089594.1, mailed Mar. 19, 2024, 17 pages. With English translation.
FMG & Mission: "Mission Summa, Skinsoftener", ID No. 7057749, Mintel GNPD [online], Nov. 2019, 9 Pages.

* cited by examiner

SEQUENCE LISTING

```
<160> NUMBER OF SEQ ID NOS: 1

<210> SEQ ID NO 1
<211> LENGTH: 11
<212> TYPE: DNA
<213> ORGANISM: Artificial
<220> FEATURE:
<223> OTHER INFORMATION: Synthetic
<220> FEATURE:
<221> NAME/KEY: misc_feature
<222> LOCATION: (6)..(8)
<223> OTHER INFORMATION: n is a, c, g, or t

<400> SEQUENCE: 1
gtgacnnngc a                                                        11
```

COMPOSITIONS AND METHODS FOR TREATING AND PREVENTING SKIN DAMAGE

This application is a national phase application under 35 U.S.C. § 371 of PCT International Application No.: PCT/US2020/066856, filed on Dec. 23, 2020, which claims priority to U.S. provisional patent application Ser. No. 62/952,931, filed Dec. 23, 2019, which is incorporated herein by reference in their entireties.

FIELD OF THE DISCLOSURE

Provided herein are compositions and method for treating and preventing skin damage. In particular, provided herein are compositions that reverse, prevent and/or slow age-related skin damage.

BACKGROUND OF THE DISCLOSURE

Skin is the outermost organ of the body, and it has various functions and significantly affects appearance and image. Total skin weight is about 3 to 5 kg of body weight, depending on a person's weight. Skin is made up of various cells and specific structure, and covers the outer surface of the body to function as a primary barrier against the external environment, including water conservation, temperature regulation, body protection from external stimuli such as UV, and protection from bacterial infection. Further, skin protects the body from physical or chemical injuries, infection caused by microorganisms (e.g., bacteria, fungi and parasites), UV damage, dryness or the like, and it also functions as sensory receptors in response to various external stimuli, and recognizes foreign antigens to generate immune cells.

Cumulative oxidative damage is thought to play a crucial role in the pathophysiology of many chronic diseases that are associated with aging. A prominent feature of aged human skin is reduced dermal strength and function, due to fragmentation and decreased production of type collagen fibrils, which comprise the bulk of the dermis.

Accordingly, there is the need for improved skin care agents that prevent the effects of aging on skin.

SUMMARY OF THE DISCLOSURE

Provided herein are compositions and method for treating and preventing skin damage. In particular, provided herein are compositions that reverse, prevent and/or slow age-related skin damage.

The compositions and methods described herein provide extracts of natural products that synergistically function to prevent and/or treat signs and symptoms of aging in skin.

For example, in some embodiments, provided herein is a composition, comprising, consisting essentially of, or consisting of: two or more components (e.g., 2, 3, or all) selected from, for example, *Malpighia emarginata* extract (e.g., *Malpighia emarginata* fruit extract), *Curcuma longa* extract (e.g., *Curcuma longa* root extract), *Osmanthus fragrans* flower extract, or *Spinacia oleracea* leaf extract, wherein the composition is formulated for topical administration.

Additional embodiments provide a composition, comprising, consisting essentially of, or consisting of: two or more components (e.g., 2 or all) selected from, for example, *Malpighia emarginata* extract, *Rubus fruticosus* leaf extract or *Centipeda cunninghamii* extract (e.g., *Centipeda cunninghamii* leaf/stem extract), wherein the composition is formulated for topical administration.

Yet other embodiments provide a composition, comprising, consisting essentially of, or consisting of: *Curcurama longa* extract, *Osmanthus fragrans* flower extract, and *Spinacia oleracea* leaf extract, wherein the composition is formulated for topical administration.

Specific embodiments provide a composition, comprising, consisting essentially of, or consisting of: *Malpighia emarginata* extract, *Rubus fruticosus* leaf extract and *Centipeda cunninghamii* extract, wherein the composition is formulated for topical administration.

Certain embodiments provide a composition, comprising, consisting essentially of, or consisting of: *Malpighia emarginata* extract, *Curcuma longa* extract, *Osmanthus fragrans* flower extract, and *Spinacia oleracea* leaf extract, wherein the composition is formulated for topical administration.

In some embodiments, the composition is a solution, a cream, lotion, a gel, an ointment, a salve or a spray.

The present disclosure is not limited to particular concentrations of the disclosed extracts. For example, in some embodiments, the *Malpighia emarginata* extract is present in the composition at a concentration of 0.1 to 1.0% (e.g., 0.1, 0.2, 0.3, 0.4, 0.5, 0.6, 0.7, 0.9, 0.9, or 1.0%) by weight; the *Rubus fruticosus* leaf extract is present in the composition at a concentration of 0.05 to 0.5% (e.g., 0.05, 0.1, 0.15, 0.2, 0.25, 0.3, 0.35, 0.4, 0.45, or 0.5%) by weight; the *Centipeda cunninghamii* extract is present in the composition at a concentration of 0.25 to 1.25% (e.g., 0.25, 0.35, 0.45, 0.55, 0.65, 0.75, 0.85, 0.95, 1.05, 1.15 or 1.25%) by weight; the *Osmanthus fragrans* flower extract is present in the composition at a concentration of 0.5 to 1.5% (e.g., 0.5, 0.6, 0.7, 0.8, 0.9, 1.0, 1.1, 1.2, 1, 1.4, or 1.5%) by weight; the *Spinacia oleracea* leaf extract is present in the composition at a concentration of 0.5 to 1.5% (e.g., 0.5, 0.6, 0.7, 0.8, 0.9, 1.0, 1.1, 1.2, 1, 1.4, or 1.5%) by weight; and the *Curcuma longa* extract is present in the composition at a concentration of 0.5 to 1.5% (e.g., 0.5, 0.6, 0.7, 0.8, 0.9, 1.0, 1.1, 1.2, 1, 1.4, or 1.5%) by weight.

Additional embodiments provide a method of repairing damaged skin, comprising: administering a composition, comprising: two or more components (e.g., 2, 3, or all) selected from, for example, *Malpighia emarginata* extract, *Curcurama longa* extract, *Osmanthus fragrans* flower extract, or *Spinacia oleracea* leaf extract, wherein the composition is formulated for topical administration to the skin of a subject under conditions such that the composition treats one or more signs or symptoms of damage of the skin.

In some embodiments, provided herein is a method of preventing skin damage, comprising: administering a composition, comprising: two or more components (e.g., 2 or all) selected from, for example, *Malpighia emarginata* extract, *Rubus fruticosus* leaf extract or *Centipeda cunninghamii* extract, wherein the composition is formulated for topical administration to the skin of a subject under conditions such that the composition prevents one or more signs or symptoms of damage of the skin.

In further embodiments, provided herein is a method of treating and/or preventing skin damage, comprising: administering a composition as described herein to a subject in need thereof.

In some embodiments, the skin damage is age-related skin damage. In some embodiments, the one or more signs or symptoms are selected from, for example, wrinkles, age spots, reduction in elasticity, and increase in dryness. In some embodiments, the composition inhibits cortisol production in the skin of the subject. In some embodiments, the composition prevents or reduces inflammation in the skin of the subject. In some embodiments, the composition is applied at least daily (e.g., for a period of one or more days to one or more weeks or year or indefinitely).

Also provided herein is the use of a composition as described herein to treat and/or prevent one or more signs or symptoms of skin damage in a subject.

Further provided are one or more compositions as described herein for use in treating and/or preventing one or more signs or symptoms of skin damage in a subject.

Additional embodiments are described herein.

DEFINITIONS

Figure 1:
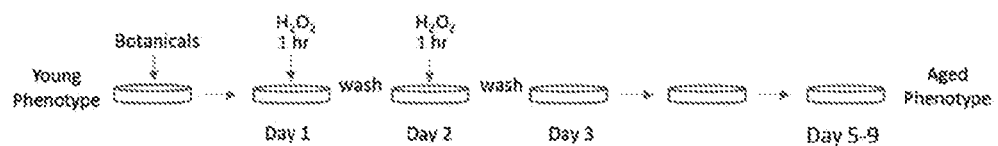
FIG. 1 shows an exemplary protocol for screening agents for prevention of oxidatively induced skin damage.

As used herein the term, "in vitro" refers to an artificial environment and to processes or reactions that occur within an artificial environment. In vitro environments include, but are not limited to, test tubes and cell cultures. The term "in vivo" refers to the natural environment (e.g., an animal or a cell) and to processes or reaction that occur within a natural environment.

As used herein, the term "effective amount" refers to the amount of a composition (e.g., a composition described herein) sufficient to effect beneficial or desired results. An effective amount can be administered in one or more administrations, applications or dosages and is not intended to be limited to a particular formulation or administration route.

As used herein, the term "administration" refers to the act of giving a drug, prodrug, or other agent, or therapeutic treatment (e.g., compositions described herein) to a physiological system (e.g., a subject or in vivo, in vitro, or ex vivo cells, tissues, and organs). Exemplary routes of administration to the human body can be through the eyes (ophthalmic), mouth (oral), skin (transdermal), nose (nasal), lungs (inhalant), oral mucosa (buccal), ear, by injection (e.g., intravenously, subcutaneously, intratumorally, intraperitoneally, etc.), topical administration and the like.

As used herein, the term "co-administration" refers to the administration of at least two agent(s) (e.g., a composition described herein) in combination with an agent known to prevent or reverse aging of skin) or therapies to a subject. In some embodiments, the co-administration of two or more agents or therapies is concurrent. In other embodiments, a first agent/therapy is administered prior to a second agent/therapy. Those of skill in the art understand that the formulations and/or routes of administration of the various agents or therapies used may vary. The appropriate dosage for co-administration can be readily determined by one skilled in the art. In some embodiments, when agents or therapies are co-administered, the respective agents or therapies are administered at lower dosages than appropriate for their administration alone. Thus, co-administration is especially desirable in embodiments where the co-administration of the agents or therapies lowers the requisite dosage of a potentially harmful (e.g., toxic) agent(s).

As used herein, the term "toxic" refers to any detrimental or harmful effects on a subject, a cell, or a tissue as compared to the same cell or tissue prior to the administration of the toxicant.

As used herein, the term "pharmaceutical composition" refers to the combination of an active agent (e.g., those described herein) with a carrier, inert or active, making the composition especially suitable for diagnostic or therapeutic use in vitro, in vivo or ex vivo.

The terms "pharmaceutically acceptable" or "pharmacologically acceptable," as used herein, refer to compositions that do not substantially produce adverse reactions, e.g., toxic, allergic, or immunological reactions, when administered to a subject.

As used herein, the term "topically" refers to application of the compositions of the present invention to the surface of the skin and mucosal cells and tissues (e.g., alveolar, buccal, lingual, masticatory, or nasal mucosa, and other tissues and cells which line hollow organs or body cavities).

As used herein, the term "pharmaceutically acceptable carrier" refers to any of the standard pharmaceutical carriers including, but not limited to, phosphate buffered saline solution, water, emulsions (e.g., such as an oil/water or water/oil emulsions), and various types of wetting agents, any and all solvents, dispersion media, coatings, sodium lauryl sulfate, isotonic and absorption delaying agents, disintrigrants (e.g., potato starch or sodium starch glycolate), and the like. The compositions also can include stabilizers and preservatives. For examples of carriers, stabilizers, and adjuvants. (See e.g., Martin, Remington's Pharmaceutical Sciences, 15th Ed., Mack. Publ. Co., Easton, Pa. (1975), incorporated herein by reference).

As used herein, the term "cell culture" refers to any in vitro culture of cells, including, e.g., prokaryotic cells and eukaryotic cells. Included within this term are continuous cell lines (e.g., with an immortal phenotype), primary cell cultures, transformed cell lines, finite cell lines (e.g., non-transformed cells), bacterial cultures in or on solid or liquid media, and any other cell population maintained in vitro.

As used herein, the term "sample" is used in its broadest sense. In one sense, it is meant to include a specimen or culture obtained from any source, as well as biological and environmental samples. Biological samples may be obtained from animals (including humans) and encompass fluids, solids, tissues, and gases. Biological samples include blood products, such as plasma, serum and the like. Such examples are not however to be construed as limiting the sample types applicable to the present invention.

DETAILED DESCRIPTION OF THE DISCLOSURE

Provided herein are compositions and method for treating and preventing skin damage. In particular, provided herein are compositions that reverse, prevent and/or slow age-related skin damage.

Oxidative exposure leads to increased intracellular levels of reactive oxygen species (ROS), which promote cellular and molecular alterations that resemble the phenotype of dermal fibroblasts in aged/photoaged human skin. Characteristic features of this phenotype include impairment of the TGF-Beta pathway, which causes decreased production of proteins that comprise the dermal extracellular matrix, such as type I procollagen, and upregulation of the AP-1 transcription factor pathway, which drives production of collagen-degrading matrix metalloproteinases and proinflammatory cytokines.

A modification of a described method of inducing fibroblast aging by exposing primary human adult cells fibroblasts to $H_2O_2$ over a prescribed regimen (He et al., AGE (2014) 36:1079-1094) was used to assay botanical extracts and combinations thereof. For example, as described in the experimental section below, by adding extract prior to peroxide, one can screen for extracts with preventative activity. In addition, compounds can be added after peroxide treatment (e.g., after an aging period) to identify extracts with repair of aged skin activity.

In the screening method, compounds were applied after oxidative exposure and then the cells were aged an additional 5 days. This work led to the finding that several compounds were capable of restoring collagen homeostasis by down regulating matrix metalloproteinase 1 MMP-1 and increasing type I procollagen. Additional experiments described herein tested botanical extracts and combinations there in cell-based models of skin aging. These complex models revealed a ranking of efficacy of the extracts, for beneficial anti-aging activities. Importantly, the testing revealed new combinations of botanicals for both prevention of skin aging as well as repair of aged skin.

The combinations of botanical extracts described herein target multiple pathways as shown in the skin oxidative exposure aging model, and are capable of inhibiting cortisol activity shown to influence skin aging. Exemplary compositions are described herein.

I. Compositions

As described herein, in some embodiments, the present disclosure provides compositions comprising one or more botanical extracts for use in treating, preventing, slowing, and/or reversing signs or symptoms of aging in skin. In some embodiments, the compounds reverse visible or other signs of aging of skin such as, including but not limited to, wrinkles, age spots, reduction in elasticity, dry skin, loss of firmness, or dryness. In some embodiments, compounds restore imbalances in collagen homeostasis found in aging skin and/or reduce inflammation in skin. Exemplary, non-limiting examples of compositions of the present disclosure are described herein. In some embodiments, compositions comprise, consist essentially of, or consist of one or more components of the below table.

| Botanicals | Extracts |
| --- | --- |
| Arctostaphylos uva | Propylene Glycol, Water, Arctostaphylos Uva-Ursi Leaf Extract |
| Asparagus officinalis | Propanediol, Glycerin, Water, Asparagus Officinalis Stem Extract |
| Berberis aquifolium | Glycerin, water, Berberis Aquifolium Extract |
| Camellia sinensis | Glycerin, Camellia Sinensis Leaf Extract |
| | Water, Glycerin, Camellia Sinensis Leaf Extract |
| | Water, Propylene Glycol, Camellia Sinensis Leaf Extract |
| Centipeda cunninghamii | Butylene Glycol, Centipeda Cunninghamii Extract |
| Coptis japonica | Water, Butylene Glycol, Coptis Japonica Rhizome Extract |
| | Water, Propylene Glycol, Coptis Japonica Rhizome Extract |
| Curcuma longa | Glycerin, Curcuma Longa Cell Extract |
| | Water, Butylene Glycol, Alcohol, Curcuma Longa (Turmeric) Root Extract |
| | Glycerin, Curcuma Longa Cell Extract |
| | Glycerin, Curcuma Longa Extract, Pentalyene Glycol, Phytic Acid, Water |
| | Water, Butylene Glycol, Alcohol, Curcuma Longa (Turmeric) Root Extract |
| | Butylene Glycol, Water, Curcuma Longa (Turmeric) Root Extract |
| | Water, Curcuma Longa Rhizome Extract |
| Euterpe oleracea | Water, Euterpe Oleracea Fruit Extract |
| Hydrastis canadensis | Butylene Glycol, Water, Hydrastis Canadensis (Goldenseal) Extract |
| Malpighia emarginata | Water, Butylene Glycol, Malpighia emarginata Fruit Extract |

-continued

| Botanicals | Extracts |
| --- | --- |
| Nasturtium officinale | Water, Nasturtium Officinale Extract |
| | Butylene Glycol, Water, Nasturtium Officinale Extract |
| | Propylene Glycol, Water, Nasturtium Officinale Leaf Extract |
| Osmanthus fragrans | Water, Osmanthus Fragrans Flower Extract, Propanediol, Glycerin |
| Phellodendron amurense | Butylene Glycol, Water, Phellodendron Amurense Bark Extract |
| Polygonum cuspidatum | Water, Butylene Glycol, Polygonum Cuspidatum Extract |
| Rhamnus purshiana | Glycerin, Water, Alcohol, Rhamnus Purshiana Bark Extract |
| | Butylene Glycol, Water, Alcohol, Rhamnus Purshiana Bark Extract |
| | Propylene Glycol, Water, Rhamnus Purshiana Bark Extract |
| | Butylene Glycol, Water, Rhamnus Purshiana Bark Extract |
| Rubus fruticosus | Maltodextrin, Rubus Fruiticosus (Blackberry) Leaf Extract |
| Rubus villosus | Butylene Glycol, Water, Rubus Villosus Leaf Extract |
| Salvia miltiorrhiza | Butylene Glycol, Water, Salvia miltiorrhiza Root Extract |
| Spinacia oleracea | Water, Butylene Glycol, Spinacia Oleracea leaf Extract |
| Theobroma cacao | Propylene Glycol, Water, Theobroma Cacao (Cocoa) Extract |
| | Glycerin, Water, Theobroma Cacao (Cocoa) Extract |
| | Butylene Glycol, Water, Theobroma Cacao (Cocoa) Extract |
| Uncaria tomentosa | Glycerin, Water, Uncaria Tomentosa Extract |
| Vicia faba | Water, Glycerin, Vicia Faba Seed Extract |

Extracts are obtained, for example, from a commercial source or by extraction. Commercial sources include, but are not limited to, *Malpighia emarginata* fruit extract (Access Business Group, LLC, Ada, MI); *Rubus fruticosus* leaf extract (SymMatrix from Symrise, Holzminden, Germany); *Centipeda cunninghamii* leaf/stem extract (Plantolin BG from Bio Actives Export, Melbourne, Australia); *Spinacia oleracea* leaf extract (Access Business Group, LLC); *Curcuma longa* root extract (HerbEx Curcuma Extract from Biospectrum through Clariant, Muttenz, Switzerland); and *Osmanthus fragrans* flower extract (DermalRx Lushield from Biocogent, Stony Brook, N.Y.).

In some exemplary embodiments, the composition comprises, consists essentially of, or consists of two or more components (e.g., 2, 3, or all) selected from, for example, *Malpighia emarginata* fruit extract, *Curcuma longa* root extract, *Osmanthus fragrans* flower extract, or *Spinacia oleracea* leaf extract; two or more components (e.g., 2 or all) selected from, for example, *Malpighia emarginata* fruit extract, *Rubus fructicosus* leaf extract or *Centipeda cunninghamii* leaf/stem extract; *Curcurama longa* root extract, *Osmanthus fragrans* flower extract, and *Spinacia oleracea* leaf extract; *Malpighia emarginata* fruit extract, *Rubus fructicosus* leaf extract and *Centipeda cunninghamii* leaf/stem extract or *Malpighia emarginata* fruit extract, *Curcuma longa* root extract, *Osmanthus fragrans* flower extract, and *Spinacia oleracea* leaf extract.

The present disclosure is not limited to particular concentrations of the disclosed extracts. For example, in some embodiments, the *Malpighia emarginata* fruit extract is present in the composition at a concentration of 0.1 to 1.0% (e.g., 0.1, 0.2, 0.3, 0.4, 0.5, 0.6, 0.7, 0.9, 0.9, or 1.0%) by weight; the *Rubus fruticosus* leaf extract is present in the composition at a concentration of 0.05 to 0.5% (e.g., 0.05, 0.1, 0.15, 0.2, 0.25, 0.3, 0.35, 0.4, 0.45, or 0.5%) by weight; the *Centipeda cunninghamii* leaf/stem extract is present in the composition at a concentration of 0.25 to 1.25% (e.g., 0.25, 0.35, 0.45, 0.55, 0.65, 0.75, 0.85, 0.95, 1.05, 1.15, or 1.25%) by weight; the *Osmanthus fragrans* flower extract is present in the composition at a concentration of 0.5 to 1.5% (e.g., 0.5, 0.6, 0.7, 0.8, 0.9, 1.0, 1.1, 1.2, 1, 1.4, or 1.5%) by weight; the *Spinacia oleracea* leaf extract is present in the composition at a concentration of 0.5 to 1.5% (e.g., 0.5, 0.6, 0.7, 0.8, 0.9, 1.0, 1.1, 1.2, 1, 1.4, or 1.5%) by weight; and the *Curcuma longa* extract root is present in the composition at a concentration of 0.5 to 1.5% (e.g., 0.5, 0.6, 0.7, 0.8, 0.9, 1.0, 1.1, 1.2, 1, 1.4, or 1.5%) by weight.

In some embodiments, compounds (e.g., those described herein) are formulated for administration to the skin in a composition (e.g., a pharmaceutical composition, a nutraceutical composition, or a cosmetic).

Pharmaceutical compositions and formulations for topical administration may include transdermal patches, ointments, lotions, creams, gels, drops, suppositories, sprays, liquids, mouthwash, and powders. Conventional pharmaceutical carriers, aqueous, powder or oily bases, thickeners and the like may be necessary or desirable.

Pharmaceutical compositions of the present disclosure include, but are not limited to, solutions, emulsions, and liposome-containing formulations. These compositions may be generated from a variety of components that include, but are not limited to, preformed liquids, self-emulsifying solids and self-emulsifying semisolids.

The compositions may additionally contain other adjunct components conventionally found in pharmaceutical compositions. Thus, for example, the compositions may contain additional, compatible, pharmaceutically-active materials such as, for example, antipruritics, astringents, local anesthetics or anti-inflammatory agents, or may contain additional materials useful in physically formulating various dosage forms of the compositions, such as dyes, flavoring agents, preservatives, antioxidants, opacifiers, thickening agents and stabilizers.

However, such materials, when added, should not unduly interfere with the biological activities of the components of the compositions. The formulations can be sterilized and, if desired, mixed with auxiliary agents, e.g., lubricants, preservatives, stabilizers, wetting agents, emulsifiers, salts for influencing osmotic pressure, buffers, colorings, flavorings and/or aromatic substances and the like which do not deleteriously interact with the active agents of the formulation.

The compositions of the present disclosure may be formulated as a solution, gel, lotion, cream, ointment, oil-in-water emulsion, water-in-oil emulsion, or other pharmaceutically acceptable form. The compositions of the present invention may also contain various known and conventional cosmetic ingredients so long as they do not detrimentally affect the desired outcomes.

The cosmetically acceptable vehicle acts as a diluent, dispersant or carrier for other materials present in the composition, so as to facilitate their distribution when the composition is applied to the skin.

Vehicles other than water can include liquid or solid emollients, solvents, humectants, thickeners and powders. For example, the following vehicles can be use alone or as a combination of one or more vehicles.

Emollients include, but are not limited to, stearyl alcohol, glyceryl monoricinoleate, mink oil, cetyl alcohol, isopropyl isostearate, stearic acid, isobutyl palmitate, isocetyl stearate, oleyl alcohol, isopropyl laurate, hexyl laurate, decyl oleate, octadecan-2-ol, isocetyl alcohol, eicosanyl alcohol, behenyl alcohol, cetyl palmitate, silicone oils such as dimethylpolysiloxane, di-n-butyl sebacate, isopropyl myristate, isopropyl palmitate, isopropyl stearate, butyl stearate, polyethylene glycol, triethylene glycol, lanolin, cocoa butter, corn oil, cotton seed oil, olive oil, palm kernel oil, rapeseed oil, safflower seed oil, evening primrose oil, soybean oil, sunflower seed oil, avocado oil, sesame seed oil, coconut oil, arachis oil, castor oil, acetylated lanolin alcohols, petroleum jelly, mineral oil, butyl myristate, isostearic acid, palmitic acid, isopropyl linoleate, lauryl lactate, myristyl lactate, decyl oleate, and/or myristyl myristate.

As used herein, "emollients" refer to materials used for the prevention or relief of dryness, as well as for the protection of the skin. A wide variety of suitable emollients are known and may be used herein. Sagarin, Cosmetics, Science and Technology, 2nd Edition, Vol. 1, pp. 32-43 (1972), incorporated herein by reference, contains numerous examples of suitable materials. Examples of classes of useful emollients include the following:

1. Hydrocarbon oils and waxes. Examples include mineral oil, petrolatum, paraffin, ceresin, ozokerite, microcrystalline wax, polyethylene, and perhydrosqualene.

2. Silicone oils, such as dimethyl polysiloxanes, methylphenyl polysiloxanes, water-soluble and alcohol-soluble silicone glycol copolymers.

3. Triglyceride esters, for example vegetable and animal fats and oils. Examples include caster oil, safflower oil, cottonseed oil, corn oil, olive oil, cod liver oil, almond oil, avocado oil, palm oil, sesame oil, and soybean oil.

4. Acetoglyceride esters, such as acetylated monoglycerides.

5. Ethoxylated glycerides, such as ethoxylated glyceryl monostearate.

6. Alkyl esters of fatty acids having 10 to 20 carbon atoms. Methyl, isopropyl, and butyl esters of fatty acids are particularly useful herein. Examples of other useful alkyl esters include hexyl laurate, isohexyl laurate, isohexyl palmitate, isopropyl palmitate, decyl oleate, isodecyl oleate, hexadecyl stearate, decyl oleate, isodecyl oleate, hexadecyl stearate, decyl stearate, isopropyl isostearate, diisopropyl adipate, diisohexyl adipate, dihexyldecyl adipate, diisopropyl sebacate, lauryl lactate, myristyl lactate, and cetyl lactate.

7. Alkenyl esters of fatty acids having 10 to 20 carbon atoms. Examples include oleyl myristate, oleyl stearate, and oleyl oleate.

8. Fatty acids having 10 to 20 carbon atoms. Suitable examples include pelargonic, lauric, myristic, palmitic, stearic, isostearic, hydroxystearic, oleic, linoleic, ricinoleic, arachidic, behenic, and erucic acids.

9. Fatty alcohols having 10 to 20 carbon atoms. Lauryl, myristyl, cetyl, hexadecyl, stearyl, isostearyl, hydroxystearyl, oleyl, ricinoleyl, behenyl, and erucyl alcohols, as well as 2-octyl dodecanol, are examples of satisfactory fatty alcohols.

10. Fatty alcohols ethers. Ethoxylated fatty alcohols of 10 to 20 carbon atoms include the lauryl, cetyl, stearyl, isostearyl, oelyl, and cholesterol alcohols having attached thereto from 1 to 50 ethylene oxide groups or 1 to 50 propylene oxide groups.

11. Ether-esters such as fatty acid esters of ethoxylated fatty alcohols.

12. Lanolin and derivatives. Lanolin, lanolin oil, lanolin wax, lanolin alcohols, lanolin fatty acids, isopropyl lanolate, ethoxylated lanolin, ethoxylated lanolin alcohols, ethoxylated cholesterol, propoxylated lanolin alcohols, acetylated lanolin, acetylated lanolin alcohols, lanolin alcohols linoleate, lanolin alcohols ricinoleate, acetate of lanolin alcohols ricinoleate, acetate of ethoxylated alcohols-esters, hydrogenolysis of lanolin, ethoxylated hydrogenated lanolin, ethoxylated sorbitol lanolin, and liquid and semisolid lanolin absorption bases are illustrative of emollients derived from lanolin.

13. Polyhydric alcohols and polyether derivatives. Propylene glycol, dipropylene glycol, polypropylene glycols 2000 and 4000, polyoxyethylene polyoxyethylene glycols, polyoxypropylene polyoxyethylene glycols, glycerol, sorbitol, ethoxylated sorbitol, hydroxypropyl sorbitol, polyethylene glycols 200-6000, methoxy polyethylene glycols 350, 550, 750, 2000 and 5000, poly[ethylene oxide]-homopolymers (100,000-5,000,004 polyalkylene glycols and derivatives, hexylene glycol (2-methyl-2,4-pentanediol), 1,3-butylene glycol, 1,2,6-hexanetriol, ethohexadiol USP (2-ethyl-1,3-hexanediol), $C_{15}$-$C_{18}$ vicinal glycol, and polyoxpropylene derivatives of trimethylopropane are examples of this class of materials.

14. Polyhydric alcohol esters. Ethylene glycol mono and di-fatty acid esters, diethylene glycol mono- and di-fatty acid esters, diethylene glycol mono- and di-fatty acid esters, polyethylene glycol (200-6000) mono- and di-fatty acid esters, propylene glycol mono- and di-fatty acid esters, polypropylene glycol 2000 monooleate, polypropylene glycol 2000 monostearate, ethoxylated propylene glycol monostearate, glyceryl mono- and di-fatty acid esters, polyglycerol poly-fatty acid esters, ethoxylated glyceryl monostearate, 1,3-butylene glycol monostearate, 1,3-butylene glycol distearate, polyoxyethylene polyol fatty acid ester, sorbitan fatty acid esters, and polyoxyethylene sorbitan fatty acid esters are satisfactory polyhydric alcohol esters for use herein.

15. Wax esters such as beeswax, spermaceti, myristyl, myristate, stearyl stearate.

16. Beeswax derivatives, e.g. polyoxyethylene sorbitol beeswax. These are reaction products of beeswax with ethoxylated sorbitol of varying ethylene oxide content, forming a mixture of ether-esters.

17. Vegetable waxes including carnauba and candelilla waxes.

18. Phospholipids, such as lecithin and derivatives.

19. Sterols. Cholesterol and cholesterol fatty acid esters are examples thereof.

20. Amides such as fatty acid amides, ethoxylated fatty acid amides, solid fatty acid alkanolamides.

Vehicles may also include propellants such as propane, isobutane, dimethyl ether, carbon dioxide, nitrous oxide; and solvents such as ethyl alcohol, isopropanol, acetone, ethylene glycol monomethyl ether, diethylene glycol monobutyl ether, diethylene glycol monoethyl ether, or powders such as chalk, talc, fullers earth, kaolin, starch, gums, collodial silica, sodium polyacrylate, tetra alkyl and/or trialkyl aryl ammonium smectites, chemically modified magnesium aluminum silicate, organically modified montmorillonite clay, hydrated aluminum silicate, fumed silica, carboxyvinyl polymer, sodium carboxymethyl cellulose, and/or ethylene glycol monostearate.

The composition can optionally comprise suncreens such as inorganic and organic sunscreens to provide protection from the harmful effects of excessive exposure to sunlight during use of the composition of the present invention.

The composition optionally can also comprise as a sunscreen titanium dioxide, zinc oxide, having an average particle size of from 1 to 300 nm, iron oxide, having an average particle size of from 1 to 300 nm, silica, such as fumed silica, having an average particle size of from 1 to 100 nm. It should be noted that silica, when used as an ingredient in the emulsion according to the invention can provide protection from infrared radiation.

In some embodiments, the composition is an emulsion, in which case an oil or oily material (emollient) will normally be present, together with an emulsifier to provide either a water-in-oil emulsion or an oil-in-water emulsion, depending largely on the average hydrophilic-lypophilic balance (HUB) of the emulsifier employed. When a water-in-oil emulsion is required, the chosen emulsifier or emulsifiers should normally have an average HLB value of from 1 to 6. When an oil-in-water emulsion is required, a chosen emulsifier or emulsifiers should have an average HLB value of >6.

Examples of suitable emulsifiers include but are not limited to, sorbitan trioleate, sorbitan trioleate, glycerol monooleate, glycerol monostearate, glycerol monolaurate, sorbitan sesquioleate, sorbitan monooleate, sorbitan monostearate, poloxyethylene, stearyl ether, poloxyethylene sorbitol, beeswax derivative, PEG 200 dilaurate, sorbitan monopalmitate, polyoxyethylene (3.5), nonyl phenol, PEG 200 monostearate, sorbitan monolaurate, PEG 400 dioleate, polyoxyethylene (5) monostearate, Polyoxyethylene (4) sorbitan, monostearate, polyoxyethylene (4) lauryl ether, polyoxyethylene (5) sorbitan, monooleate, PEG 300 monooleate, polyoxyethylene (20), sorbitan tristearate, polyoxyethylene (20), sorbitan trioleate, polyoxyethylene (8) monostearate, PEG 400 monooleate, PEG 400 monostearate, polyoxyethylene 10 monooleate, polyoxyethylene (10) stearyl ether, polyoxyethylene (10) cetyl ether, polyoxyethylene (9.3) octyl phenol, polyoxyethylene (4), sorbitan monolaurate, PEG 600 monooleate, PEG 1000 dilaurate, polyoxyethylene sorbitol, lanolin derivative, polyoxyethylene (12) lauryl ether, PEG 1500 dioleate, polyoxyethylene (14) laurate, polyoxyethylene (20) Tween, sorbitan monostearate, polyoxyethylene 20 sorbitan, monooleate, polyoxyethylene (20) stearyl ether, polyoxyethylene (20), sorbitan monopalmitate, polyoxyethylene (20) cetyl ether, polyoxyethylene (25), oxypropylene monostearate, polyoxyethylene (20), sorbitol monolaurate, polyoxyethylene (23) lauryl ether, polyoxyethylene (50), monostearate, and/or PEG 4000 monostearate.

It is to be understood that two or more emulsifiers can be employed if desired. The amount of emulsifier or mixtures thereof, which optionally can be incorporated in the composition is from 1 to 50%, 2 to 20%, or 2 to 10% by weight of the composition.

The composition can also comprise water, usually up to 95%, e.g., from 5 to 95% by weight.

The composition can also optionally comprise a high molecular weight silicone surfactant that can also act as an emulsifier, in place of or in addition to the option emulsifier(s) already mentioned.

The amount of silicone surfactant, when present in the composition will normally be up to 25%, preferably from 0.5 to 15% by weight of the emulsion.

Examples of conventional adjuncts which can optionally be employed include preservatives, such as para-hydroxy benzoate esters; antioxidants, such butyl hydroxy toluene; humectants, such as glycerol, ethoxylated glycerins such as glycereth-26, sorbitol, 2-pyrrolidone-5-carboxylate, dibutylphthalate, gelatin, polyethylene glycol, such as PEG 200-600; buffers together with a base such as triethanolamine or sodium hydroxide; waxes, such as beeswax, ozokerite wax, paraffin wax; plant extracts, such as *Aloe vera*, cornflower, witch hazel, elderflower, cucumber; as well as *Acerola cherry* fermentate, thickeners; activity enhancers; colorants; and perfumes. Cosmetic adjuncts can form the balance of the composition.

It may also be desirable to incorporate anti-inflammatory and/or anti-irritant agents. The natural anti-inflammatory and/or anti-irritant agents are preferred. For example, licorice and its extracts, dipotassium glycyrrhizinate, oat and oat extracts, candelilla wax, alpha bisabolol, *Aloe vera*, Manjistha (extracted from plants in the genus *Rubia*, particularly *Rubia cordifolial*), and Guggal (extracted from plants in the genus *Commiphora*, particularly *Commiphora Mukul*), may be used.

Additional skin benefit agents such as ceramides, glycoceramides, pseudoceramides, sphingolipids such as sphingomyelins, cerebrosides, sulphatides, and ganglioside, sphingosines, dihydrosphingosine, phytosphingosines, phospholipids, may also be incorporated, either separately or in mixtures. Fatty acids may also be combined with these skin benefit agents. For example, the ceramides and glycoceramides include those described in U.S. Pat. Nos. 5,589,178, 5,661,118, and 5,688,752, the relevant portions of which are incorporated herein by reference. For example, the pseudoceramides include those described in U.S. Pat. Nos. 5,198,210; 5,206,020; and 5,415,855, the relevant disclosures of which are incorporated herein by reference.

In some embodiments, the pharmaceutical or cosmetic composition contain a) a composition described herein; and b) one or more other agents useful in treating, preventing, or reversing aging of skin.

In some embodiments, compositions are administering in a maintenance or ongoing manner (e.g., one or more times a day, two or more times a day, one or more times a week, etc.). In some embodiments, compositions are administered continuously (e.g., via a skin patch, bandage, or time release formulation). In some embodiments, compositions are administered, once, twice, 5 times, 10 times or more. In some embodiments, compositions are administered over a period of weeks, months, years or indefinitely.

II. Uses

As described herein, the compositions of the present disclosure find use in treating, preventing, or slowing skin damage e.g., age related skin damage). In some embodiments, compositions are optimized for either reversing or preventing skin damage. For example, in some embodiments, compositions for repairing damaged skin (e.g., reversing skin damage) comprise, consist essentially of, or consist of: two or more components (e.g., 2, 3, or all) selected from, for example, *Malpighia emarginata* fruit extract, *Curcuma longa* root extract, *Osmanthus fragrans* flower extract, or *Spinacia oleracea* leaf extract.

In some embodiments, compositions for preventing skin damage comprise, consist essentially of, or consist of two or more components (e.g., 2 or all) selected from, for example, *Malpighia emarginata* fruit extract, *Rubus fruticosus* leaf extract, or *Centipeda cunninghamii* stem/leaf extract.

In some embodiments, administering a composition described herein prevents or reduces one or more symptoms of skin damage (e.g., wrinkles, age spots, reduction in elasticity, and increase in dryness). In some embodiments, the composition inhibits cortisol production in the skin of the subject. In some embodiments, the composition prevents or reduces inflammation in the skin of the subject.

In some embodiments, the composition is applied at least daily (e.g., for a period of one or more days to one or more weeks or year or indefinitely).

EXPERIMENTAL

The following examples are provided to demonstrate and further illustrate certain embodiments of the present disclosure and are not to be construed as limiting the scope thereof.

Example 1

This Example describes screening of botanical extracts for prevention and repair of aging related skin damage.

Figure 2:
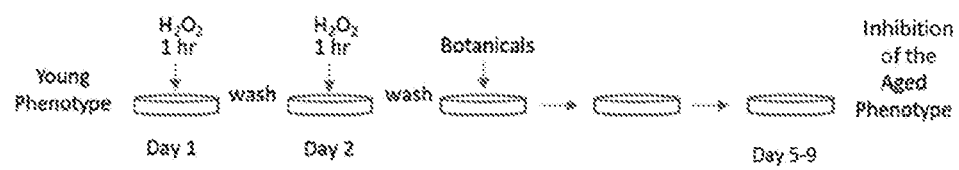
FIG. 2 shows an exemplary protocol for screening agents for prevention and repair of oxidatively induced skin damage.
Figure 3:
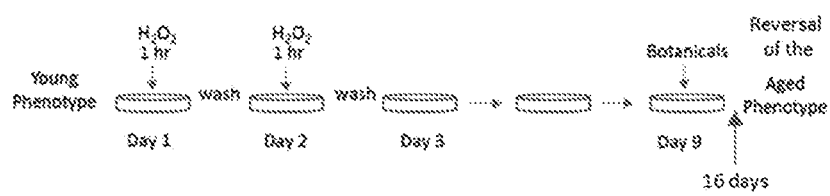
FIG. 3 shows an exemplary protocol for screening agents for reversal and prevention of oxidatively induced skin damage.

The following compositions were used in this Example: Prevention: 0.5% *Acerola cherry*, 0.1% black berry, 0.75% *Centipeda*; Repair: 1% *Osmanthus*, 1% spinach, 1% turmeric Botanicals were tested in the oxidative exposure aging model described in FIGS. 1-3. The testing was done in 3 steps divided into 5 pathways:
1. Early Prevention of the Aged Phenotype
    a. Activation of antioxidant pathways measured by survival and proliferation endpoints. Botanicals were added prior to oxidative exposure and measured for their ability to prevent the formation of the aging phenotype.
2. Mid Aged Aging Phenotype Prior to Acquiring a Permanent Aged Phenotype
    a. Early Protection/Recovery: Inhibition of AP-1/MMP1 collagen damage pathway. The botanicals were added after oxidative exposure, a time before the fibroblasts acquired a permanent aged phenotype.
    b. Early Protection/Recovery: protection of TGF-beta/collagen production pathway. The botanicals were added after oxidative exposure but before the fibroblasts acquired a permanent aged phenotype.
3. Fully Acquired Aged Phenotype
    a. Recovery: Inhibition of AP-1/MMP1 collagen damage pathway. The botanicals were added after the fibroblasts stabilized into an aged phenotype.
    b. Recovery: protection of TGF-beta/collagen production pathway. The botanicals were added after the fibroblasts stabilized into an aged phenotype.

The testing revealed unique rank ordering of effectiveness of the botanicals for suppressing different aging pathways at different stages of aging (early, middle, and fully acquired (Tables 1-5). This finding indicated that unique combinations of active botanicals provided more comprehensive anti-aging benefits that single agents.

Anti-Oxidant Response Element Assay

Figure 4:
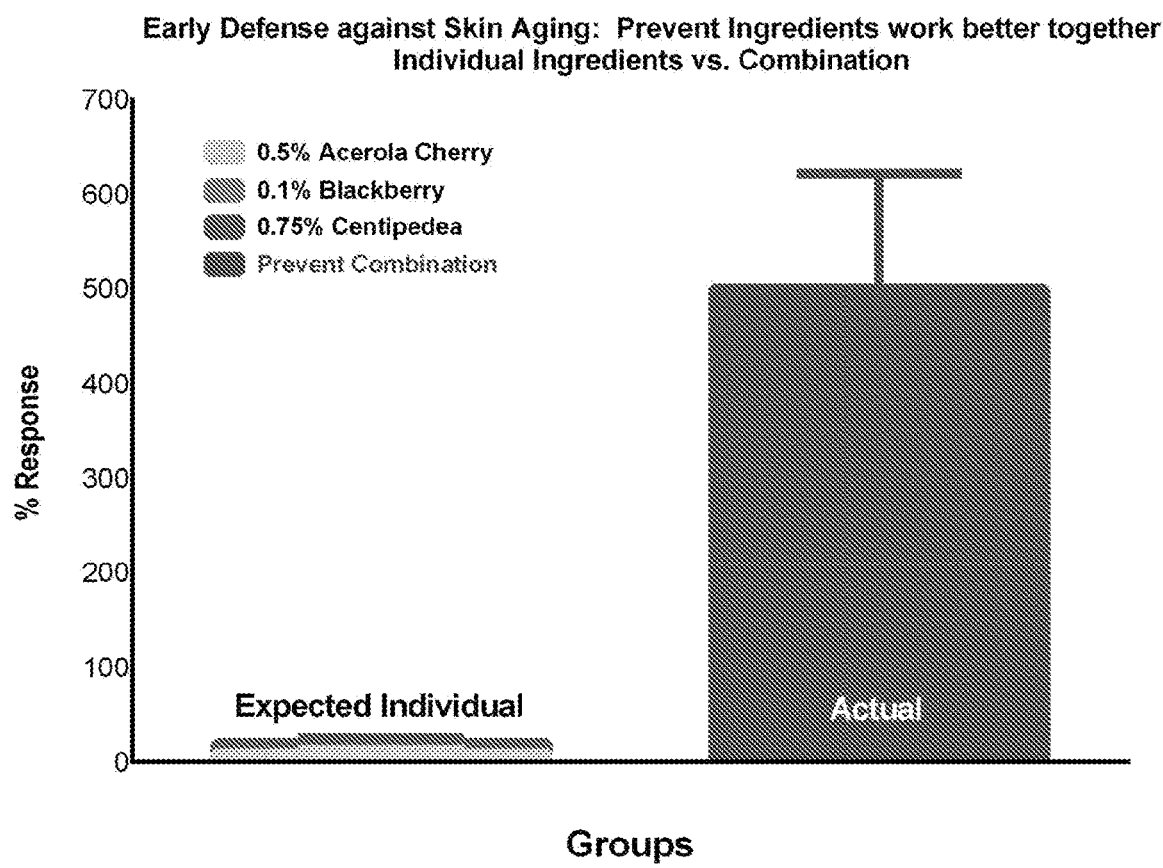
FIG. 4 shows prevention of aging induced skin damage by a combination of botanical extracts.

HepG2 cells, stably transfected with a luciferase reporter construct (pGL4.27) under the control of the Anti-Oxidant Response Element (6X: GTGACxxxGCA (SEQ ID NO:1) were placed at a density of 30000 cells per well in white-walled collagen-coated plates in minimal essential tissue culture media containing 10% serum. After 24 hr, individual ingredients (*Acerola cherry* (AC), Blackberry powder (BB) and *Centipeda cunninghamii* extract (CC); were diluted in tissue culture media and added to the wells at specified concentrations. Also, the 3 ingredients were combined at a ratio of 0.5:0.1:0.75 of AC:BB:CC, respectively. This combination was diluted to various concentrations and added to the testing wells. After 48 hours, the cells were lysed and luciferase was quantified using a luciferase test as per manufacturer instructions (Biotium, Inc., Hayward, CA). Data are presented as a % response of untreated wells. Individual ingredient responses at a specific dose are presented as a stacked bar labeled "Expected" in FIG. 4. These are the expected values of the ARE response if the samples effect was added together. The combination treatment using the same individual doses is displayed in FIG. 4, and are presented as the "Actual" labelled bar in FIG. 4 and represent the response of the combination and they show synergistic activity.

HemOxigenase (HOX)

Figure 5:
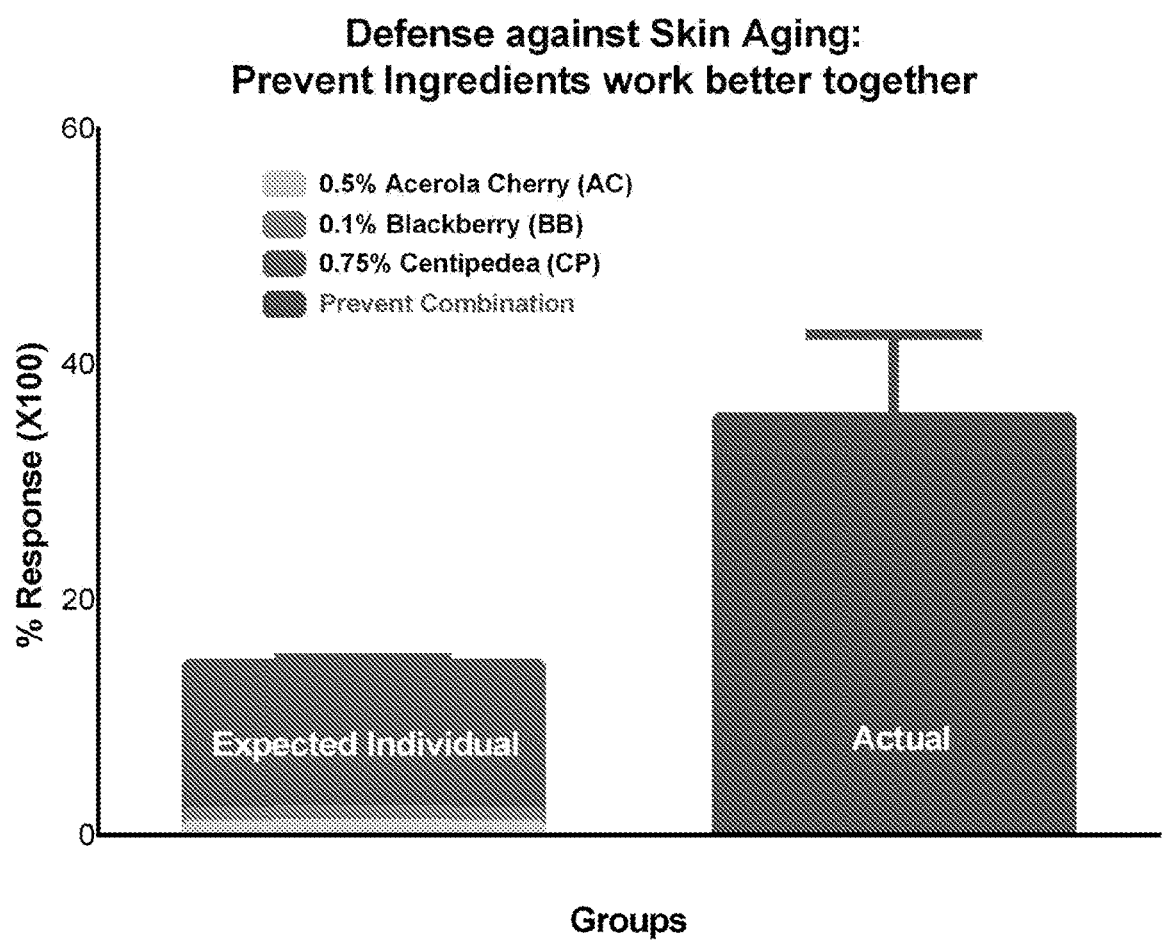
FIG. 5 shows prevention of aging induced skin damage by a combination of botanical extracts.
Figure 6:
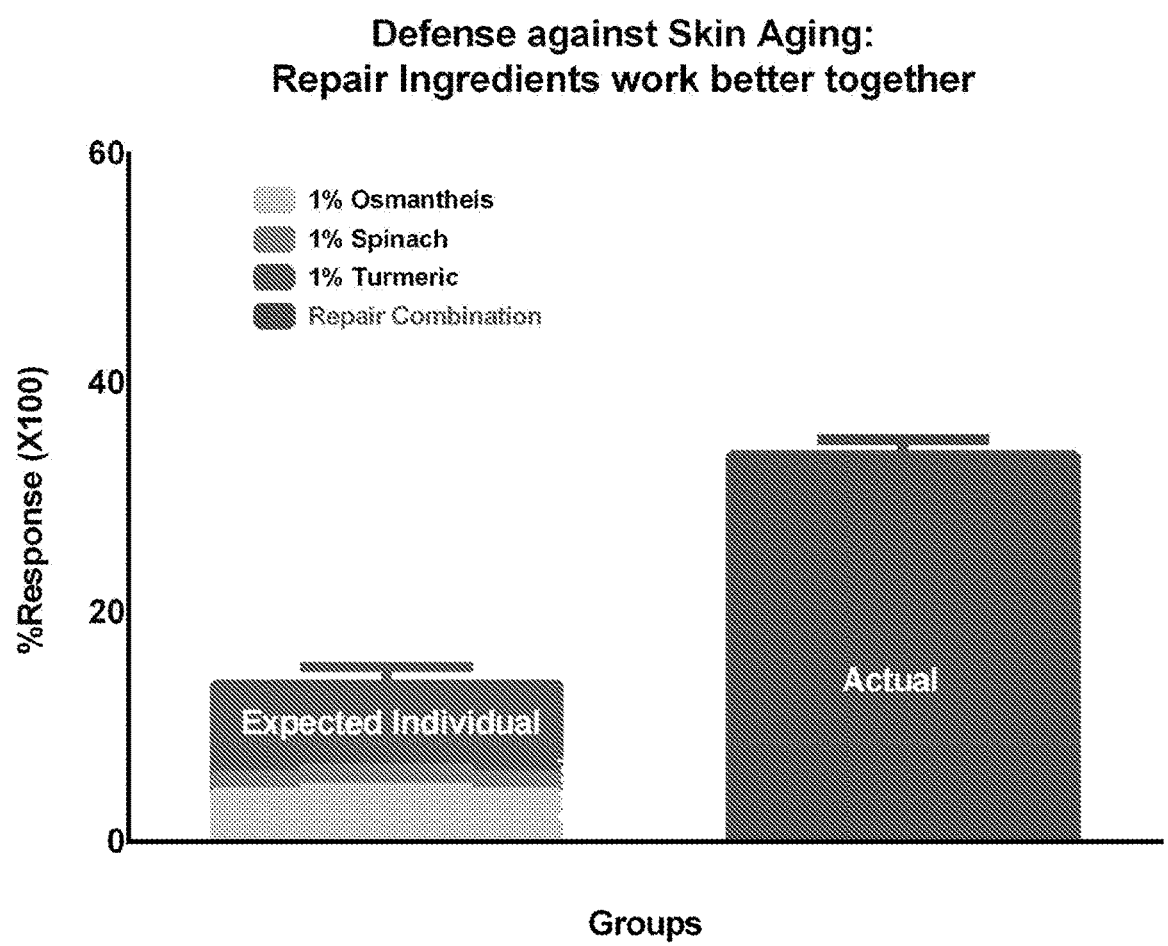
FIG. 6 shows repair of aging induced skin damage by a combination of botanical extracts.

AG01518 fibroblast cells were maintained in MEM+2% charcoal stripped FBS+1% Penicillin/Streptomycin/Amphotericin B. After plating 20,000 cells per well in 96 well plates, cells were maintained in MEM+2% charcoal stripped FBS. They were treated for 18 hours with individual ingredients of the prevent and repair complexes as well as various dilutions of the specific prevent and repair complexes. The prevent complex contained *Acerola cherry* (AC), blackberry powder (BB) and *Centipeda cunninghammi* extract (CC)) while the repair complex contained Spinach Leaf (SL, NF7321A), *Osmantheis* (OF; RN2407) and turmeric (T; (RN2404)) at various concentrations. After ingredient treatment, cells were lysed and RNA isolated RT-qPCR was employed to quantify HOX expression. Cycle threshold values of each gene was normalized to its internal housekeeping gene HPRT1. The treatment expression value was divided by the mean expression value of untreated control to calculate HOX Fold Expression level above untreated controls. Data are presented as a % response of untreated wells. Individual ingredient effect on HOX gene responses at a specific dose are presented as a stacked bar labeled "Expected" in FIGS. 5 and 6. These are the expected values of the ARE response if the samples worked individually. The complex treatment using the same individual doses "combined" together is displayed in FIGS. 5 and 6, and are presented as the "Actual" labelled bar in FIGS. 5 and 6. The Actual bar represents the response if the ingredients acted synergistically.

Human Dermal Fibroblast Repair Assay

Human dermal fibroblast (HDF) cells were grown in 6 wells plate in DMEM medium (growth medium). At 70% confluency the cells were first washed with Phosphate buffered saline (PBS) and then treated with 1.50 µM of $H_2O_2$ for 1 hour in the treatment medium (growth medium without serum). Subsequent to the treatment the cells were washed with phosphate buffered serum (PBS) twice then growth medium was added to the cells and the plates were kept in the incubator. The next day, the same treatment (treatment with $H_2O_2$) was repeated. The day after two consecutive days of $H_2O_2$ treatment human dermal fibroblasts were treated with the ingredients in the "repair complex" either Individually or in combination (day 1). The cells were allowed to grow for four more days. Then on day 5 the cells were lysed and RNA isolated with RNAeasy mini kit from Qiagen (Germantown, MD). Various sets of RNA were then quantified via absorption at 260 nm. Total RNA was then converted to cDNA using iscript cDNA synthesis kit from Bio-RAD (Hercules, CA). The cDNA was then diluted 5 fold and 5 µl was used per qPCR reaction. qPCR was done using Sso advances Universal SYBR green supermix from Bio-Rad (Hercules, CA). The primers were bought from Qiagen (Germantown, MD).

Figure 7:
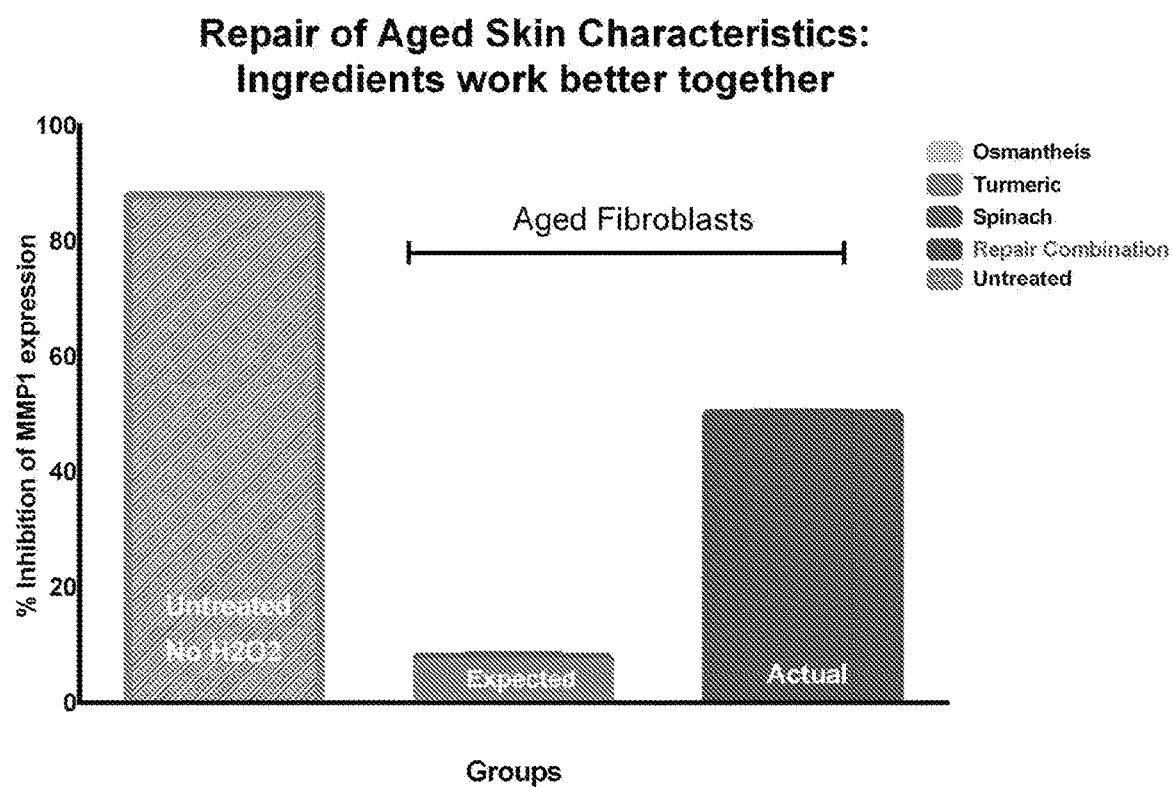
FIG. 7 shows repair of aging induced skin damage by a combination of botanical extracts.

Data is presented as a percent inhibition of MMP1 response. Individual ingredient responses at a specific dose are presented as a stacked bar labeled "Expected" in FIG. 7. These are the expected values from this assay if the samples effect was added together. The combination treatment using the same individual doses are presented as the "Actual" labelled bar and represent the response of the combination. The combination exhibits synergy since the response is much more than the sum of the individual responses at that same concentration.

TABLE 1

Prevention of the aging phenotype: Activation of Antioxidant pathways measured by survival and proliferation endpoints.

| Extract/Carrier | Company | percent tested highest non-toxic dose | relative effectiveness |
|---|---|---|---|
| Curcuma Longa Rhizome Extract, water | Barnet Products | 8 | 1 |
| Propanediol, Glycerin, Water, Asparagus Officinalis Stem Extract | DSM | 2 | 0.61 |
| Water, Nasturtium Officinale Extract | Silab | 1.5 | 0.44 |
| Glycerin, Water, Alcohol, Rhamnus Purshiana Bark Extract | Bio-Biotanica | 6 | 0.4 |
| Water, Glycerin, Vicia Faba Seed Extract | Vincience Biofunctionals | 8 | 0.33 |
| Glycerin, water, Berberis Aquifolium Extract | Botanica | 5 | 0.29 |
| Glycerin, Camellia Sinensis Leaf Extract | Lipotec | 2 | 0.24 |
| Glycerin, Rubus Fruticosus (Blackberry) Leaf Cell Extract | Naolys | 4 | 0.24 |
| Glycerin, Camellia Sinensis Leaf Extract | Lipotec | 4 | 0.23 |
| Water, Propylene Glycol, Camellia Sinensis Leaf Extract | Active Concepts | 0.5 | 0.16 |

TABLE 2

Mid aged aging phenotype prior to acquiring a permanent aged phenotype Early Protection: Inhibition of AP-1/MMP1 collagen damage pathway.

| Extract/Carrier | Company | percent tested highest non-toxic dose | relative effectiveness |
|---|---|---|---|
| Aqua (and) Osmanthus Fragrans Flower Extract (and) Propanediol (and) Glycerin | Biocogent | 3 | 1 |
| Butylene Glycol, Water, Alcohol, Rhamnus Purshiana Bark Extract | Bio-Biotanica | 1 | 0.68 |
| Water, Propylene Glycol, Coptis Japonica Rhizome Extract | Draco | 0.5 | 0.67 |
| Propylene Glycol, Water, Rhamnus Purshiana Bark Extract | Bio-Biotanica | 2 | 0.47 |
| Propylene Glycol, Water, Theobroma Cacao (Cocoa) Extract | Solabia | 2 | 0.37 |
| Butylene Glycol, Water, Rubus Villosus (Blackberry) Leaf Extract | Lipotec | 0.5 | 0.33 |
| Water, Euterpe Oleracea Fruit Extract | Active Concepts | 1 | 0.29 |
| Glycerin, Curcuma Longa Cell Extract | Naolys | 2 | 0.28 |
| Water, Butylene Glycol, Polygonum Cuspidatum Extract | Active Concepts | 1.5 | 0.23 |
| Water, Butylene Glycol, Coptis Japonica Rhizome Extract | Draco | 1 | 0.20 |

TABLE 3

Mid aged aging phenotype prior to acquiring a permanent aged phenotype Early Recovery: protection of TGF-beta/collagen production pathway.

| Extract/Carrier | Company | percent tested highest non-toxic dose | relative effectiveness |
|---|---|---|---|
| Water, Butylene Glycol, Alcohol, Curcuma Longa (Turmeric) Root Extract | Biospectrum | 1 | 1 |
| Glycerin, Curcuma Longa Cell Extract | Naolys | 2 | 0.97 |
| Butylene Glycol, Water, Rhamnus Purshiana Bark Extract | Bio-Biotanica | 1 | 0.91 |
| Butylene Glycol, Water, Rhamnus Purshiana Bark Extract | Bio-Biotanica | 1 | 0.85 |
| Butylene Glycol, Water, Curcuma Longa (Turmeric) Root Extract | Solabia | 0.5 | 0.78 |
| Glycerin, Rubus Fruticosus (Blackberry) Leaf Cell Extract | Naolys | 2 | 0.74 |
| Glycerin, Water, Theobroma Cacao (Cocoa) Extract | Lipotec | 2 | 0.65 |
| Butylene Glycol, Water, Nasturtium Officinale Leaf/Stem Extract | IPC Japan | 3 | 0.64 |
| Glycerin, Curcuma Longa Extract, Pentalyene Glycol, Phytic Acid, Water | Barnet Products | 4 | 0.63 |
| Butylene Glycol, Water, Theobroma Cacao (Cocoa) Extract | Oryza Oil & Fat Chemical Co. Ltd. | 1 | 0.62 |

TABLE 4

Fully acquired aged phenotype Recovery: Inhibition of AP-1/MMP1 collagen damage pathway.

| Extract/Carrier | Company | percent tested highest non-toxic dose | relative effectiveness |
|---|---|---|---|
| Propylene Glycol, Water, Nasturtium Officinale Leaf Extract | GreenTech | 5 | 1 |
| Butylene Glycol, Water, Rubus Villosus (Blackberry) Leaf Extract | Lipotec | 0.5 | 0.97 |
| Propylene Glycol, Water, Arctostaphylos Uva-Ursi Leaf Extract | Lipotec | 1.5 | 0.64 |
| Propylene Glycol, Water, Theobroma Cacao (Cocoa) Extract | Solabia | 2 | 0.59 |
| Curcuma Longa Rhizome Extract, water | Barnet Products | 8 | 0.55 |
| Glycerin, Water, Uncaria Tomentosa Extract | Lipotec | 2 | 0.54 |
| Butylene Glycol & Water & Salvia miltiorrhiza Root Extract | SiLab | 1.5 | 0.38 |
| Water, Butylene Glycol, Alcohol, Curcuma Longa (Turmeric) Root Extract | Biospectrum | 1 | 0.35 |
| Butylene Glycol, Water, Theobroma Cacao (Cocoa) Extract | Solabia | 1 | 0.29 |
| Butylene Glycol, Water, Phellodendron Amurense Bark Extract | Lipotec | 1 | 0.28 |

TABLE 5

Fully acquired aged phenotype Recovery: protection of TGF-beta/collagen production pathway

| Extract/Carrier | Company | percent tested highest non-toxic dose | relative effectiveness |
|---|---|---|---|
| Butylene Glycol, Water, Hydrastis Canadensis (Goldenseal) Extract | Bio-Biotanica | 1.5 | 1 |
| Water, Butylene Glycol, Coptis Japonica Rhizome Extract | Draco | 0.5 | 0.81 |
| Water, Propylene Glycol, Coptis Japonica Rhizome Extract | Draco | 1 | 0.77 |

TABLE 5-continued

Fully acquired aged phenotype Recovery: protection of TGF-beta/collagen production pathway

| Extract/Carrier | Company | percent tested highest non-toxic dose | relative effectiveness |
|---|---|---|---|
| Propylene Glycol, Water, Nasturtium Officinale Leaf Extract | GreenTech | 4 | 0.71 |
| Water, Propylene Glycol, Coptis Japonica Rhizome Extract | Draco | 0.5 | 0.60 |
| Water, Glycerin, Camellia Sinensis Leaf Extract | Active Concepts | 0.4 | 0.59 |
| Aqua (and) Osmanthus Fragrans Flower Extract (and) Propanediol (and) Glycerin | Biocogent | 3 | 0.57 |
| Glycerin, water, Berberis Aquifolium Extract | Botanica | 5 | 0.56 |
| Butylene Glycol, Water, Nasturtium Officinale Extract | Lipotec | 2 | 0.55 |
| Butylene Glycol, Water, Phellodendron Amurense Bark Extract | IPC Japan | 0.5 | 0.51 |

Example 2

Figure 8:
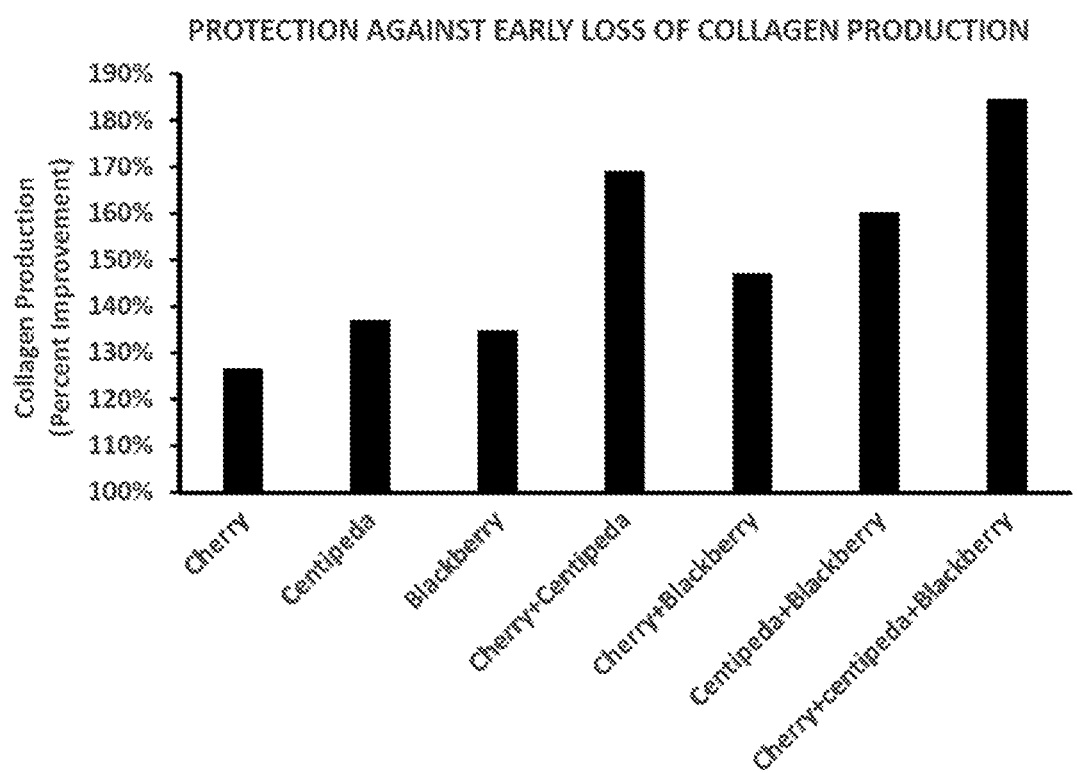
FIG. 8 shows protection against early loss of collagen production by a combination of botanical extracts.

Prevent Complex Ingredients Shield Against Loss of Type I Procollagen Production in Adult Human Skin Fibroblasts: Prevention Model of Skin Aging Primary adult human skin fibroblasts were cultured in DMFM media with 10% fetal bovine serum (FBS) for 24 hours. The fibroblasts were treated with the indicated Prevent Complex ingredients from *Acerola cherry* (Cherry), *Rubus fruticosus* blackberry leaf (Blackberry), or *Centipeda cunninghamii* (Centipeda), either alone or in combination, for two days. The fibroblasts were then placed in serum-free DMEM and exposed to 100 μM $H_2O_2$) (oxidative exposure) for one hour, on two consecutive days. After each oxidative exposure, the medium was replaced with fresh media containing FBS and Prevent Complex ingredient's). Six days after the second oxidative exposure the media were replaced with media containing 2% FBS (without Prevent Complex ingredients), and 12 hours later the conditioned media were collected for measurement of type I procollagen protein by ELISA. The levels of type procollagen protein were normalized to fibroblast number. The relative concentrations of the Prevent Complex ingredients were Cherry:Blackberry:Centipeda 0.5:0.1:0.75. Results are shown in FIG. 8. Data are representative of three independent experiments.

Figure 9:
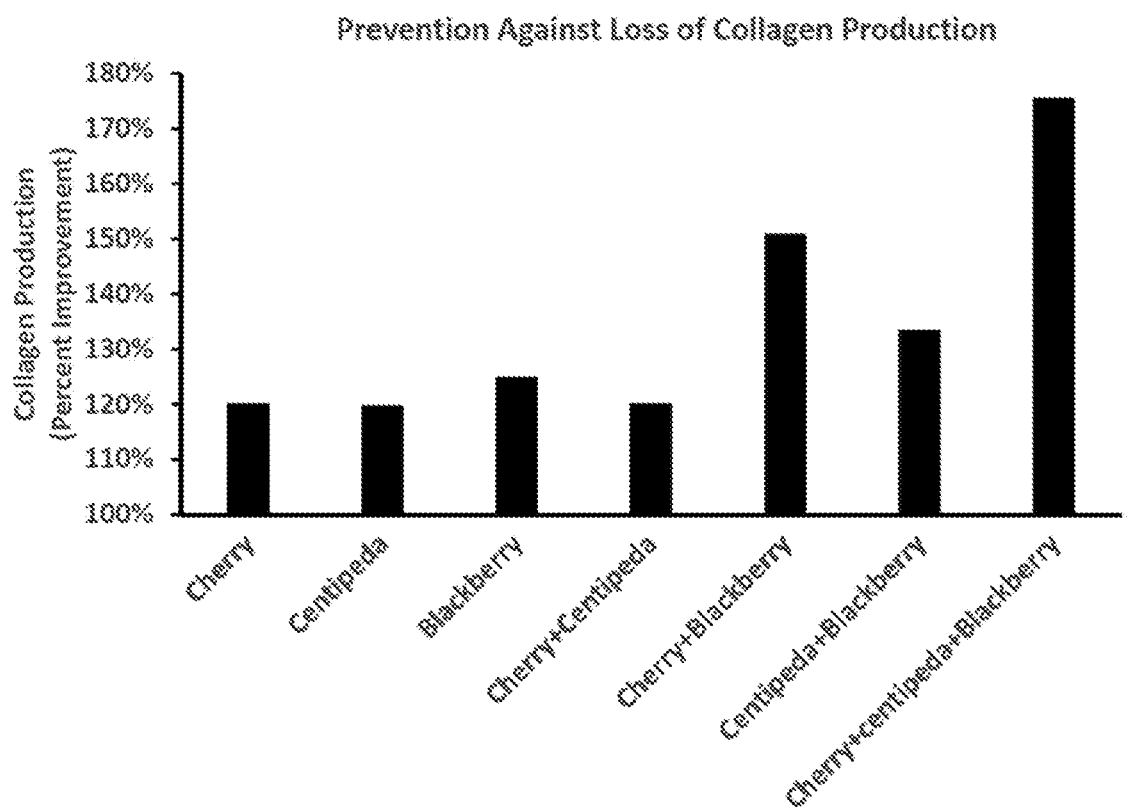
FIG. 9 shows protection against early loss of collagen production by a combination of botanical extracts.

Prevent Complex Ingredients Improve Type I Procollagen Production in Adult Human Skin Fibroblasts: Early Treatment Model of Skin Aging Primary adult human skin fibroblasts were cultured in DMEM media with 10% fetal bovine serum (FBS) for 24 hours. The fibroblasts were then placed in serum-free DMEM and exposed to 100 μM $H_2O_2$ (oxidative exposure), for one hour, on two consecutive days. After each oxidative exposure, the media were replaced with fresh FBS-containing media. One day after the second oxidative exposure, the cells were cultured in media containing the indicated Prevent Complex ingredients from *Acerola cherry* (Cherry), *Rubus fruticosus* blackberry leaf (Blackberry), or *Centipeda cunninghamii* (Centipeda), either alone or in combination. Six days after the second oxidative exposure the media were replaced with media containing 2% FBS (without Prevent Complex ingredients), and 12 hours later the conditioned media were collected for measurement of type I procollagen protein by ELISA. The levels of type I procollagen protein were normalized to fibroblast number. The relative concentrations of the Prevent Complex ingredients were Cherry:Blackberry:Centipeda 0.5:0.1:0.75. Results are shown in FIG. 9. Data are representative of two independent experiments.

Figure 10:
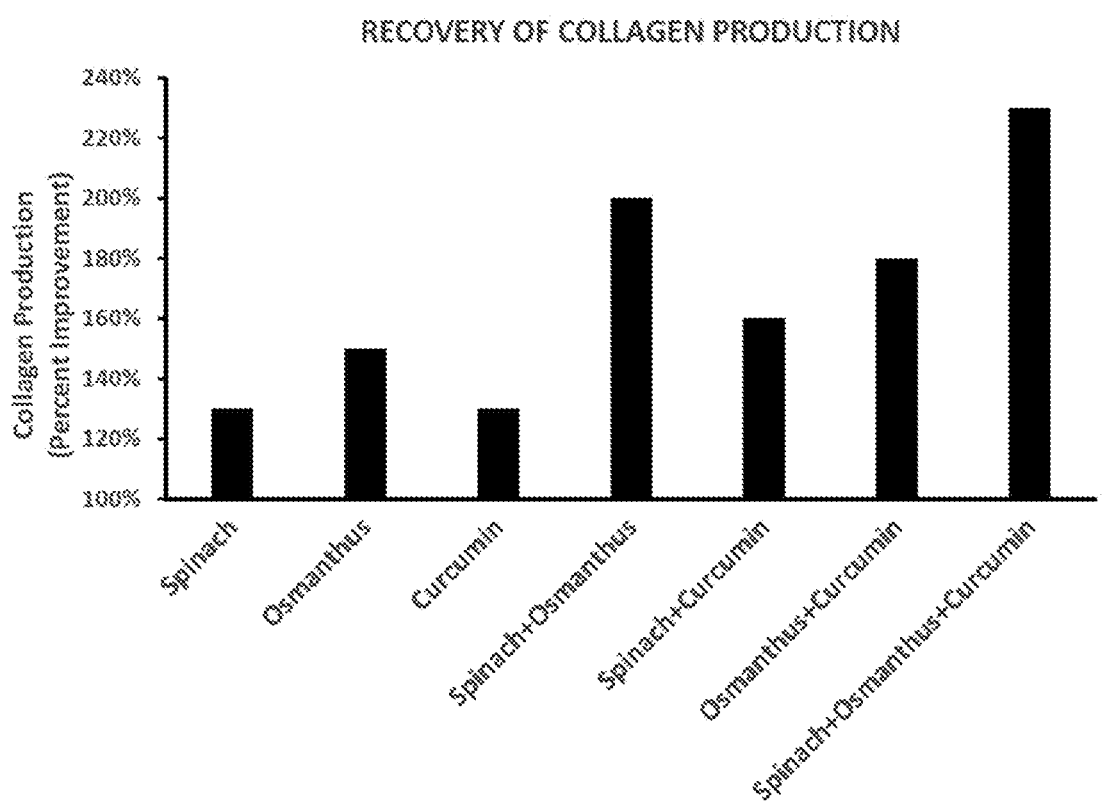
FIG. 10 shows recovery of collagen production by a combination of botanical extracts.

Repair Complex Ingredients Restore Type I Procollagen Production in Adult Human Skin Fibroblasts: Rejuvenation Model of Skin Aging Human skin fibroblasts were cultured in DMEM media with 10% fetal bovine serum (BS) until confluent. The Fibroblasts were then placed in serum-free DMEM and exposed to 200 μM $H_2O_2$ (oxidative exposure), for one hour, on two consecutive days. After each oxidative exposure, the media were replaced with fresh media containing 10% FBS. Five days after oxidative exposure, the fibroblasts were collected by trypsinization, counted, and equal numbers of fibroblasts were cultured in media with 10% FBS, in 24-well plates. Two days later, the fibroblasts were treated with the indicated Repair Complex ingredients from Spinach Extract (Spinach), *Osmanthus fragrans* (Asian Tea Olive) flower extract (Osmanthus), or *Curcuma longa* Extract (Curcumin), either alone or in combination, for six days. The media were then replaced with media containing 2% FBS (without Repair Complex ingredients) and 12 hours later the conditioned media were collected for measurement of type I procollagen protein by ELISA. The levels of type I procollagen protein were normalized to fibroblast number. The relative concentrations of the Repair Complex ingredients were Spinach:Osmanthus:Curcumin 1:1:1. Results are shown in FIG. 10. Data are representative of two independent experiments.

Figure 11:
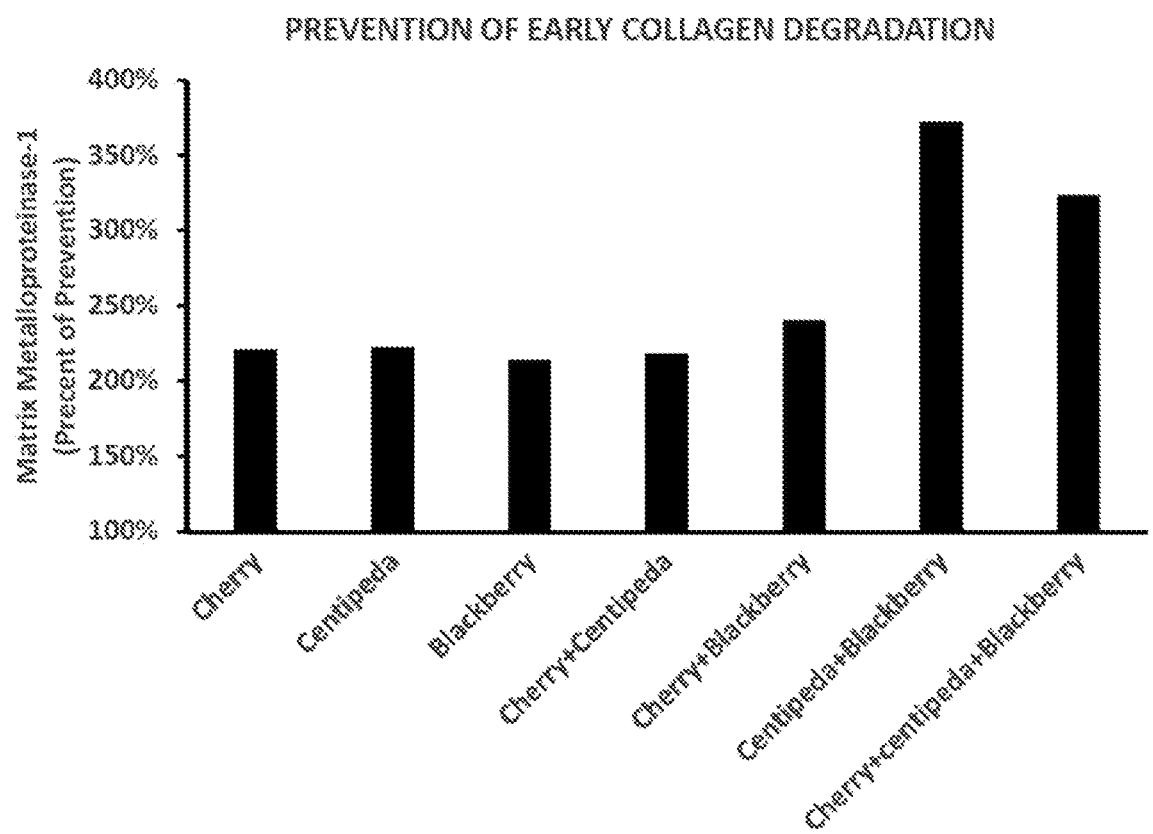
FIG. 11 shows protection against early collagen degradation by a combination of botanical extracts.

Prevent Complex Ingredients Shield Against Collagen-Degrading Matrix Metalloproteinase in Adult Human Skin Fibroblasts: Prevention Model of skin aging Primary adult human skin fibroblasts were cultured in DMEM media with 10% fetal bovine serum (FBS) for 24 hours. The fibroblasts were treated with the indicated prevent Complex ingredients from *Acerola cherry* (Cherry), *Rubus fruticosus* blackberry leaf (Blackberry), or *Centipeda cunninghamii* (Centipeda), either alone or in combination, for two days. The fibroblasts were then placed in serum-free DMEM and exposed to 100 μM $H_2O_2$ (oxidative exposure) for one hour, on two consecutive days. After each oxidative exposure, the medium was replaced with fresh media containing 10% FBS and Prevent Complex ingredient(s). Six days after the second oxidative exposure the media were replaced with media containing 2% FBS (without Prevent Complex ingredients), and 12 hours later the conditioned media were collected for measurement of matrix metalloproteinase I protein by ELISA. The levels of matrix metalloproteinase I protein were normalized to fibroblast number. The relative concentrations of the Prevent Complex ingredients were Cherry:Blackberry:*Centipeda* 0.5:0.1:0.75. Results are shown in FIG. 11. Data are representative of three independent experiments.

Figure 12:
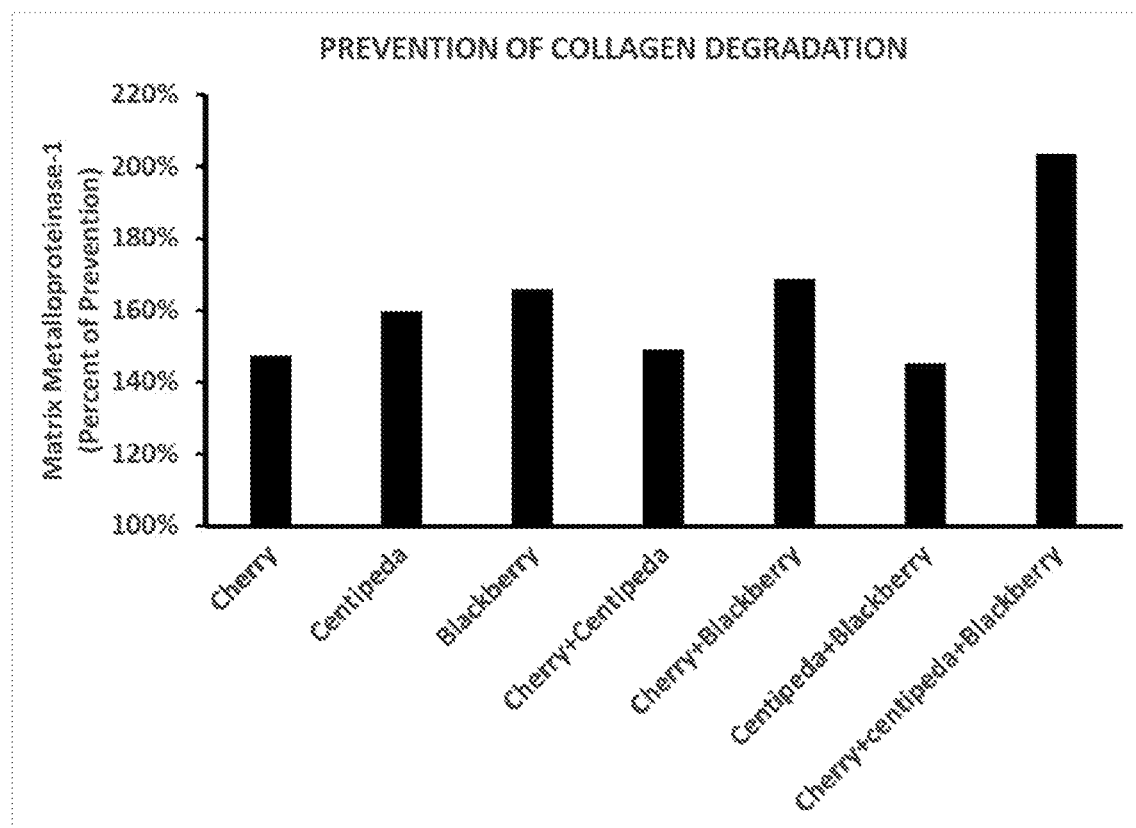
FIG. 12 shows protection against collagen degradation by a combination of botanical extracts.

Prevent Complex Ingredients Reduce Collagen-Degrading Matrix Metalloproteinase I in Adult Human Skin Fibroblasts: Early Treatment Model of Skin Aging Primary adult human skin fibroblasts were cultured in DMEM media with 10% fetal bovine serum (FBS) for 24 hours. The fibroblasts were then placed in serum-free DMEM and exposed to 100 μM $H_2O_2$ (oxidative exposure), for one hour, on two consecutive days. After each oxidative exposure, the media were replaced with fresh media containing 10% FBS. One day after the second oxidative exposure, the cells were cultured in media containing the indicated Prevent Complex ingredients from *Acerola cherry* (Cherry), *Rubus fruticosus* blackberry leaf (Blackberry), or *Centipeda cunninghamii* (*Centipeda*), either alone or in combination. Six days after the second oxidative exposure the media were replaced with media containing 2% FBS (without Repair Complex ingredients), and 12 hours later the conditioned media were collected for measurement of matrix metalloproteinase I protein by ELISA. The levels of matrix metalloproteinase I protein were normalized to fibroblast number. The relative concentrations of the Prevent Complex ingredients were Cherry:Blackberry:*Centipeda* 0.5:0.1:0.75. Results are shown in FIG. 12. Data are representative of two independent experiments.

Figure 13:
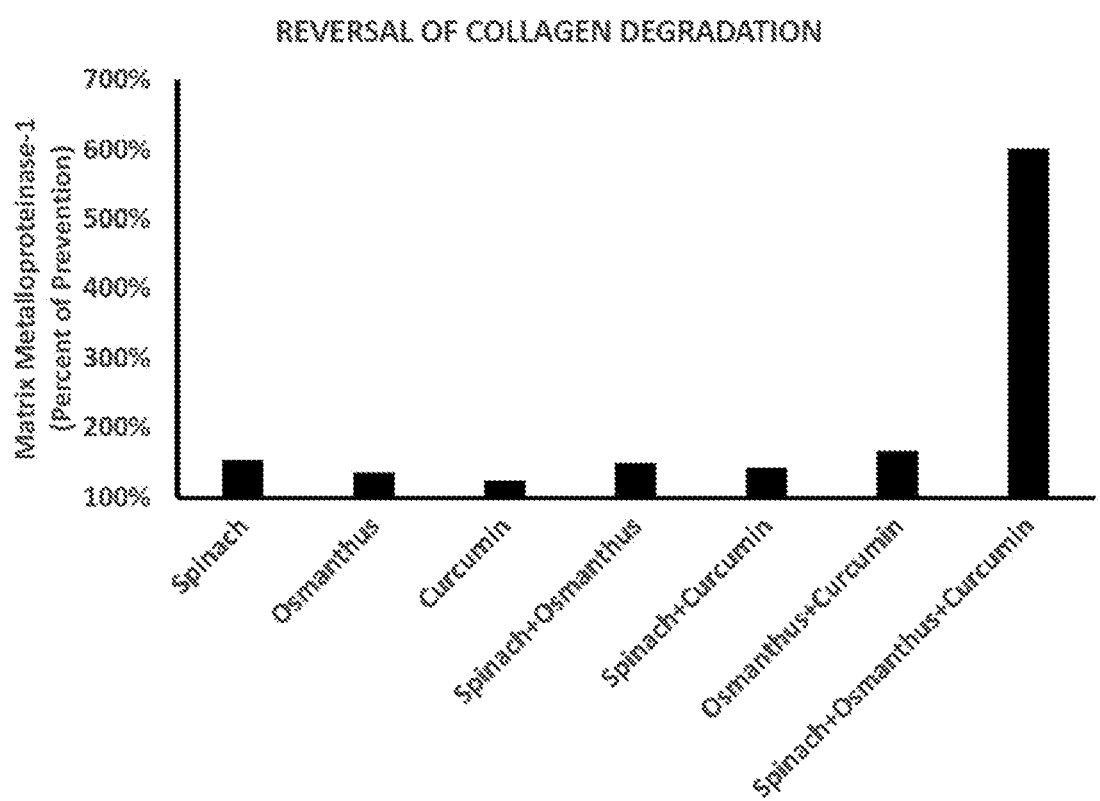
FIG. 13 shows reversal of collagen degradation by a combination of botanical extracts.

Repair Complex Ingredients Reverse Elevated Levels of Collagen-Degrading Matrix Metalloproteinase I Production in Adult Human Skin Fibroblasts: Rejuvenation Model of Skin Aging Human skin fibroblasts were cultured in DMEM media with 10% fetal bovine serum (FBS) until confluent. The Fibroblasts were then placed in serum-free DMFM and exposed to 200 μM $H_2O_2$ (oxidative exposure), for one hour, on two consecutive days. After each oxidative exposure, the media were replaced with fresh media containing 10% FBS. Five days after oxidative exposure, the fibroblasts were collected by trypsinization, counted, and equal numbers of cells were placed to 24-well plates. Two days later, the fibroblasts were treated with the indicated Repair Complex ingredients from Spinach Extract (Spinach), *Osmanthus fragrans* (Asian Tea Olive) flower extract (*Osmanthus*), or *Curcuma longa* Extract (Curcumin), either alone or in combination, in fresh media containing 10% FBS, for six days. The media were then replaced with media containing 2% FBS (without Repair Complex ingredients) and 12 hours later the conditioned media were collected for measurement of matrix metalloproteinase I protein by ELISA. The levels of matrix metalloproteinase I were normalized to fibroblast number. The relative concentrations of the Repair Complex ingredients were Spinach:*Osmanthus*:Curcumin 1:1:1. Results are shown in FIG. 13. Data are representative of two independent experiments.

Prevent Complex Ingredients Inhibit Production of the Inflammatory Mediator Prostaglandin E2 in Human Epidermal Skin Cells.

Figure 14:
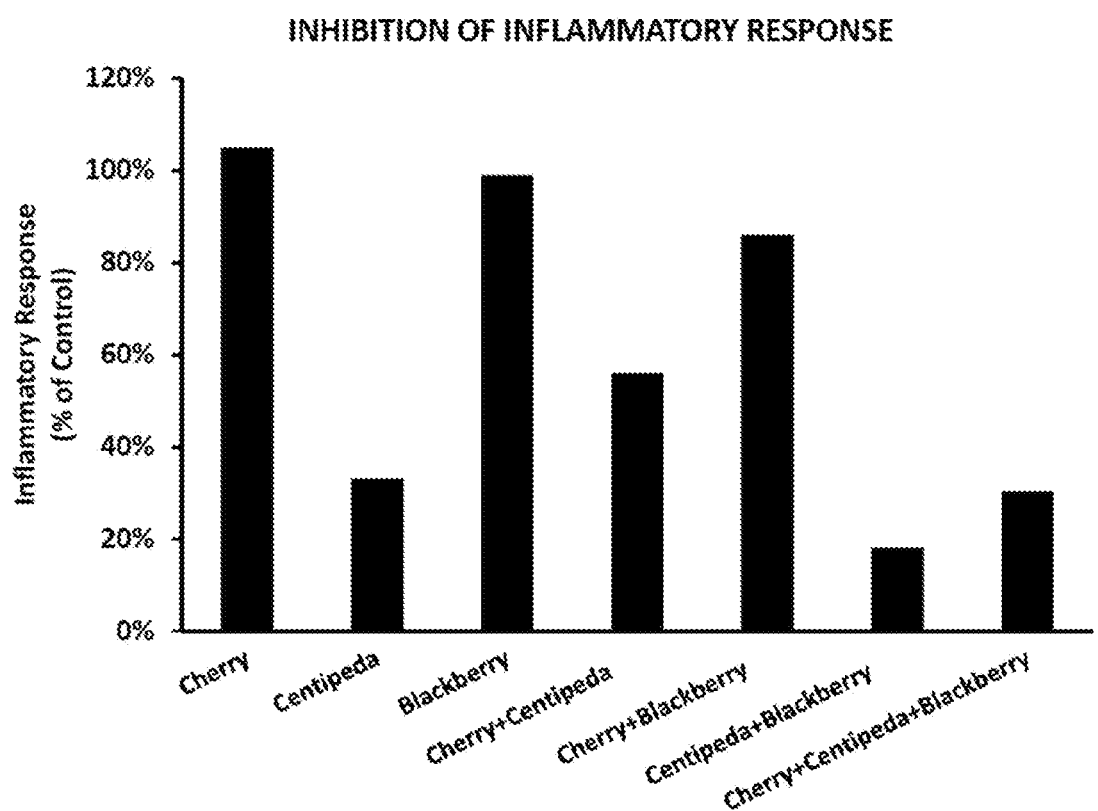
FIG. 14 shows inhibition of an inflammatory response by a combination of botanical extracts.

Human skin cells (keratinocytes) were cultured in Keratinocyte Serum-free Growth Media (SGM) to 60-70% confluence. Keratinocytes were then cultured in fresh SGM containing 1% fetal bovine serum (FBS) for 24 hours. The media were replaced with fresh SGM containing 1% FBS and the indicated Prevent complex ingredients from *Acerola cherry* (Cherry), *Rubus fruticosus* blackberry leaf (Blackberry), or *Centipeda cunninghamii* (*Centipeda*), either alone or in combination. Conditioned media was collected six hours later for measurement of prostaglandin $E_2$ ($PGE_2$) by ELISA. The levels of $PGE_2$ were normalized to keratinocyte number. The relative concentrations of the Prevent Complex ingredients were Cherry:Blackberry:*Centipeda* 0.5:0.1:0.75. Results are shown in FIG. 14. Results are representative of 2 independent experiments.

Repair Complex Ingredients Inhibit Production of the Inflammatory Mediator Prostaglandin $E_2$ in Human Epidermal Skin Cells.

Figure 15:
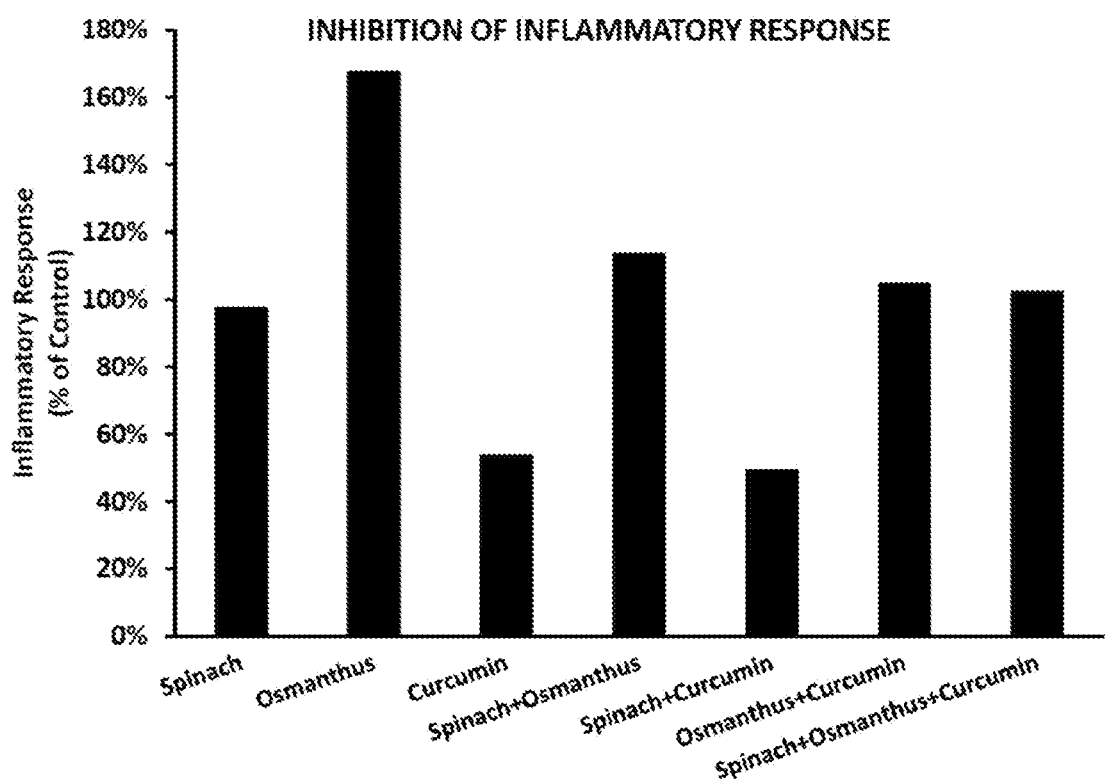
FIG. 15 shows inhibition of an inflammatory response by a combination of botanical extracts.

Human skin cells (keratinocytes) were cultured in Keratinocyte Serum-free Growth Media (SGM) to 60-70% confluence. Keratinocytes were then cultured in fresh SGM containing 1% fetal bovine serum (FBS) for 24 hours. The media were then replaced with fresh SGM containing 1% FBS and the indicated Repair Complex ingredients from Spinach Extract (Spinach), *Osmanthus fragrans* (Asian Tea Olive) flower extract (*Osmanthus*), or *Curcuma longa* Extract (Curcumin), either alone or in combination. Conditioned media was collected six hours later for measurement of prostaglandin $E_2$ ($PGE_2$) by ELISA. The levels of $PGE_2$ were normalized to keratinocyte number. The relative concentrations of the Repair Complex ingredients were Spinach:*Osmanthus*:Curcumin 1:1:1. Results are shown in FIG. 15. Data are representative of 2 independent experiments.

Repair Complex Ingredients Inhibit the Production of the Stress Hormone Cortisol.

Figure 16:
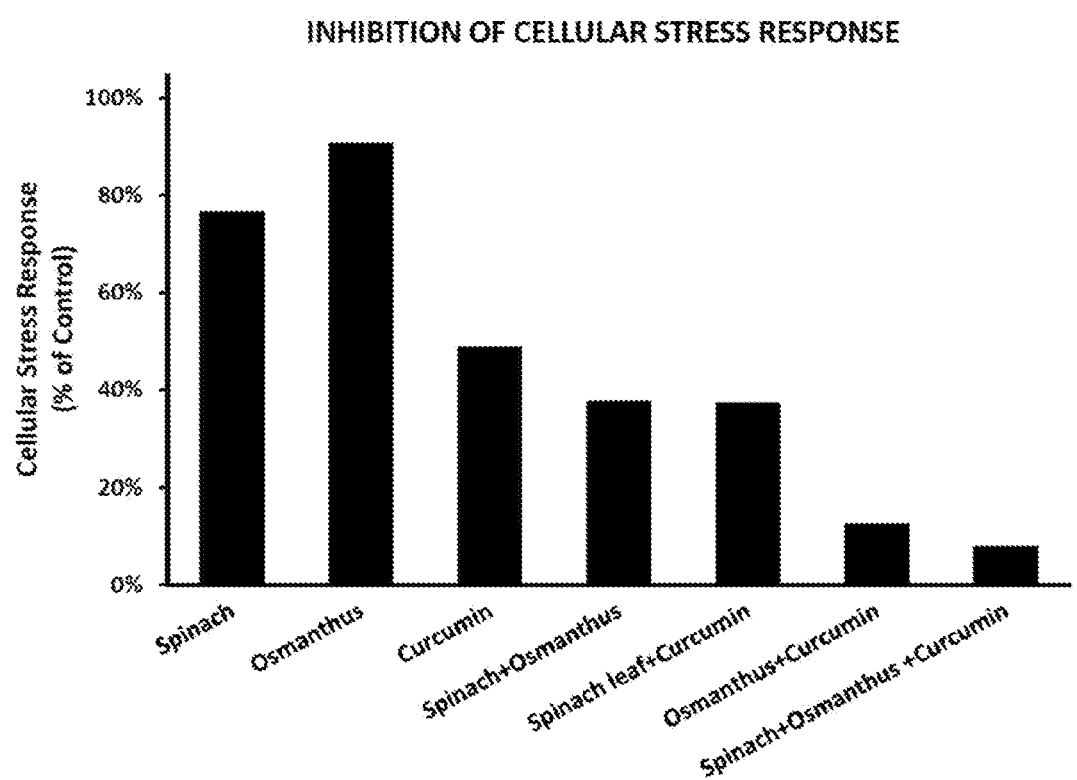
FIG. 16 shows inhibition of a cellular stress response by a combination of botanical extracts.

Human adrenal cells (H295 cells) were cultured in DMEM/F12 (1:1) media containing 10% Cosmic calf serum (CCS) to 60-70% confluence. Cells were then cultured in DMEM/F12 (1:1) media containing 0.1% CSS for 24 hours. The media were then replaced with fresh DMEM/F12 (1:1) media containing 0.1% CSS and the indicated Repair Complex ingredients from Spinach Extract (Spinach), *Osmanthus fragrans* (Asian Tea Olive) flower extract (*Osmanthus*), or *Curcuma longa* Extract (Curcumin), either alone or in combination. The conditioned media were collected 22 hours later for measurement of cortisol by ELISA. The levels of cortisol were normalized to cell number. The relative concentrations of the Repair Complex ingredients were Spinach:*Osmanthus*:Curcumin 1:1:1. Results are shown in FIG. 16. Data are representative of 3 independent experiments.

Prevent Complex Ingredients Inhibit the Production of the Stress Hormone Cortisol.

Figure 17:
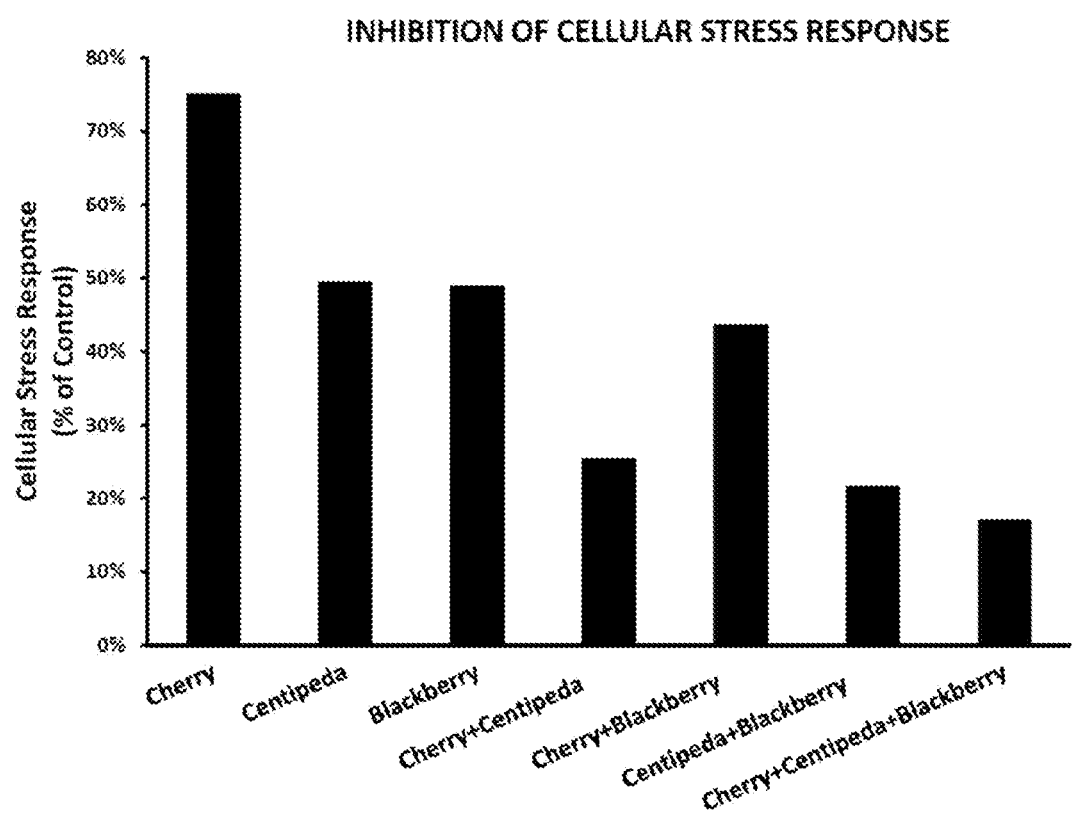
FIG. 17 shows inhibition of a cellular stress response by a combination of botanical extracts.

Human adrenal cells (H295 cells) were cultured in DMEM/F12 (1:1) media containing 10% Cosmic calf serum (CCS) to 60-70% confluence. Cells were then cultured in DMEM/F12 (1:1) media containing CSS for 24 hours. The media were then replaced with fresh DMEM/F12 (1:1) media containing 0.1% CSS and the indicated Prevent Complex ingredients from *Acerola cherry* (Cherry); *Rubus fruticosus* blackberry leaf (Blackberry), or *Centipeda cunninghamii* (*Centipeda*), either alone or in combination. The conditioned media were collected 22 hours later for measurement of cortisol by ELISA. The levels of cortisol were normalized to cell number. The relative concentrations of the Prevent Complex ingredients were Cherry:Blackberry:*Centipeda* 0.5:0.1:0.75. Results are shown in FIG. 17. Results are 1.0 representative of 3 independent experiments.

All publications, patents, patent applications and accession numbers mentioned in the above specification are herein incorporated by reference in their entirety. Although the invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the following claims.

We claim:

1. A composition, comprising: *Curcuma longa* root extract, *Osmanthus fragrans* flower extract, and *Spinacia oleracea* leaf extract, wherein said composition is formulated for topical administration.

2. The composition of claim 1, wherein said composition is selected from the group consisting of a solution, a cream, a lotion, a gel, an ointment, a salve and a spray.

3. The composition of claim 1, wherein said *Osmanthus fragrans* flower extract is present in said composition at a concentration of 0.5 to 1.5% by weight.

4. The composition of claim 3, wherein said *Osmanthus fragrans* flower extract is present in said composition at a concentration of 1.0% by weight.

5. The composition of claim 1, wherein said *Spinacia oleracea* leaf extract is present in said composition at a concentration of 0.5 to 1.5% by weight.

6. The composition of claim 5, wherein said *Spinacia oleracea* leaf extract is present in said composition at a concentration of 1.0% by weight.

7. The composition of claim 1, wherein said *Curcuma longa* root extract is present in said composition at a concentration of 0.5 to 1.5% by weight.

8. The composition of claim 7, wherein said *Curcuma longa* root extract is present in said composition at a concentration of 1.0% by weight.

9. A method of repairing damaged skin, comprising:
administering the composition of claim 1 to the skin of a subject under conditions such that said composition treats one or more signs or symptoms of damage of said skin.

10. A method of treating and/or preventing skin damage, comprising:
administering the composition of claim 1 to a subject in need thereof.

11. The method of claim 9, wherein said damage is age-related skin damage.

12. The method of claim 9, wherein said one or more signs or symptoms are selected from the group consisting of wrinkles, age spots, reduction in elasticity, and increase in dryness.

13. The method of claim 9, wherein said composition inhibits cortisol production in the skin of said subject.

14. The method of claim 9, wherein said composition prevents or reduces inflammation in the skin of said subject.

15. The method of claim 9, wherein said composition is applied at least daily.

* * * * *